United States Patent
Klug et al.

(10) Patent No.: US 11,231,584 B2
(45) Date of Patent: Jan. 25, 2022

(54) SYSTEM AND METHOD FOR PRESENTING IMAGE CONTENT ON MULTIPLE DEPTH PLANES BY PROVIDING MULTIPLE INTRA-PUPIL PARALLAX VIEWS

(71) Applicant: Magic Leap, Inc., Plantation, FL (US)

(72) Inventors: Michael Anthony Klug, Austin, TX (US); Robert Konrad, Palo Alto, CA (US); Gordon Wetzstein, Palo Alto, CA (US); Brian T. Schowengerdt, Seattle, WA (US); Michal Beau Dennison Vaughn, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 359 days.

(21) Appl. No.: 15/789,895

(22) Filed: Oct. 20, 2017

(65) Prior Publication Data

US 2018/0113311 A1  Apr. 26, 2018

Related U.S. Application Data

(60) Provisional application No. 62/411,490, filed on Oct. 21, 2016.

(51) Int. Cl.
*G02B 27/01*  (2006.01)
*G02B 30/24*  (2020.01)
(Continued)

(52) U.S. Cl.
CPC ..... *G02B 27/0172* (2013.01); *G02B 27/0179* (2013.01); *G02B 30/24* (2020.01);
(Continued)

(58) Field of Classification Search
None
See application file for complete search history.

(56) References Cited

U.S. PATENT DOCUMENTS 6,445,406 B1  9/2002  Taniguchi et al.
6,590,573 B1  7/2003  Geshwind et al.
(Continued)

FOREIGN PATENT DOCUMENTS

JP  2002-228987  8/2002
WO  WO 2006/022620  3/2006
(Continued)

OTHER PUBLICATIONS

Huang F.-C. et al., "The Light Field Stereoscope—Immersive Computer Graphics via Factored Near-Eye Light Field displays with Focus Cues", SIGGRAPH Emerging Technologies (Jul. 2015); 12 pages.
(Continued)

*Primary Examiner* — Gelek W Topgyal
(74) *Attorney, Agent, or Firm* — Knobbe, Martens, Olson & Bear, LLP

(57) ABSTRACT

An augmented reality display system is configured to direct a plurality of parallactically-disparate intra-pupil images into a viewer's eye. The parallactically-disparate intra-pupil images provide different parallax views of a virtual object, and impinge on the pupil from different angles. In the aggregate, the wavefronts of light forming the images approximate a continuous divergent wavefront and provide selectable accommodation cues for the user, depending on the amount of parallax disparity between the intra-pupil images. The amount of parallax disparity is selected using a light source that outputs light for different images from different locations, with spatial differences in the locations of the light output providing differences in the paths that the light takes to the eye, which in turn provide different amounts of parallax disparity. Advantageously, the wavefront divergence, and the accommodation cue provided to the eye of the user, may be varied by appropriate selection
(Continued)

of parallax disparity, which may be set by selecting the amount of spatial separation between the locations of light output.

37 Claims, 21 Drawing Sheets

(51) Int. Cl.
| | | |
|---|---|---|
| G02B 30/34 | (2020.01) | |
| H04N 13/128 | (2018.01) | |
| H04N 13/383 | (2018.01) | |
| H04N 13/344 | (2018.01) | |
| H04N 13/341 | (2018.01) | |
| H04N 13/339 | (2018.01) | |
| H04N 13/398 | (2018.01) | |
| H04N 13/324 | (2018.01) | |
| H04N 13/346 | (2018.01) | |

(52) U.S. Cl.
CPC ........... *G02B 30/34* (2020.01); *H04N 13/128* (2018.05); *H04N 13/339* (2018.05); *H04N 13/341* (2018.05); *H04N 13/344* (2018.05); *H04N 13/383* (2018.05); *H04N 13/398* (2018.05); *G02B 2027/0134* (2013.01); *G02B 2027/0187* (2013.01); *H04N 13/324* (2018.05); *H04N 13/346* (2018.05); *H04N 2213/008* (2013.01)

(56) References Cited

U.S. PATENT DOCUMENTS

| | | | |
|---|---|---|---|
| 6,850,221 | B1 | 2/2005 | Tickle |
| 8,573,784 | B2 | 11/2013 | Yeh et al. |
| 8,950,867 | B2 | 2/2015 | Macnamara |
| 9,081,426 | B2 | 7/2015 | Armstrong |
| 9,215,293 | B2 | 12/2015 | Miller |
| 9,310,559 | B2 | 4/2016 | Macnamara |
| 9,348,143 | B2 | 5/2016 | Gao et al. |
| D758,367 | S | 6/2016 | Natsume |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt et al. |
| 9,841,563 | B2 | 12/2017 | Lapstun |
| 9,851,563 | B2 | 12/2017 | Gao et al. |
| 9,857,591 | B2 | 1/2018 | Welch et al. |
| 9,874,749 | B2 | 1/2018 | Bradski |
| 2006/0028436 | A1 | 2/2006 | Armstrong |
| 2007/0081123 | A1 | 4/2007 | Lewis |
| 2009/0005961 | A1 | 1/2009 | Grabowski et al. |
| 2012/0127062 | A1 | 5/2012 | Bar-Zeev et al. |
| 2012/0162549 | A1 | 6/2012 | Gao et al. |
| 2012/0306860 | A1* | 12/2012 | Hatta .................. H04N 13/279 345/419 |
| 2013/0082922 | A1 | 4/2013 | Miller |
| 2013/0117377 | A1 | 5/2013 | Miller |
| 2013/0125027 | A1 | 5/2013 | Abovitz |
| 2013/0126618 | A1 | 5/2013 | Gao |
| 2013/0208234 | A1 | 8/2013 | Lewis |
| 2013/0242262 | A1 | 9/2013 | Lewis |
| 2013/0286053 | A1 | 10/2013 | Fleck et al. |
| 2014/0063077 | A1 | 3/2014 | Wetzstein et al. |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0205259 | A1 | 7/2015 | Kim et al. |
| 2015/0222883 | A1 | 8/2015 | Welch |
| 2015/0222884 | A1 | 8/2015 | Cheng |
| 2015/0260994 | A1* | 9/2015 | Akutsu ..................... G02B 6/34 359/567 |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2015/0370075 | A1* | 12/2015 | Ato ...................... G02B 27/017 359/240 |
| 2016/0011419 | A1 | 1/2016 | Gao |
| 2016/0026253 | A1 | 1/2016 | Bradski et al. |
| 2016/0116739 | A1 | 4/2016 | TeKolste et al. |
| 2016/0139402 | A1 | 5/2016 | Lapstun |
| 2016/0270656 | A1 | 9/2016 | Samec et al. |
| 2017/0078652 | A1 | 3/2017 | Hua et al. |
| 2017/0091917 | A1 | 3/2017 | Bronstein et al. |
| 2017/0102545 | A1 | 4/2017 | Hua et al. |
| 2018/0031838 | A1 | 2/2018 | Browne |
| 2019/0075252 | A1 | 3/2019 | Zhao |
| 2019/0253667 | A1 | 8/2019 | Valli |
| 2020/0033803 | A1* | 1/2020 | Christmas ............ G03H 1/2205 |
| 2020/0301147 | A1 | 9/2020 | Klug |

FOREIGN PATENT DOCUMENTS

| | | |
|---|---|---|
| WO | WO 2015/134740 | 9/2015 |
| WO | WO 2016/134037 | 8/2016 |
| WO | WO 2017/079480 | 5/2017 |
| WO | WO 2018/075968 | 5/2018 |

OTHER PUBLICATIONS

Wetzstein G. et al., "Tensor Displays: Compressive Light Field Synthesis using Multilayer Displays with Directional Backlighting", Association for Computing Machinery (Jul. 2012); 11 pages.
International Search Report and Written Opinion for PCT Application No. PCT/US2017/057730, dated Dec. 27, 2017.
International Preliminary Report on Patentability for PCT Application No. PCT/US2017/57730, dated Apr. 23, 2019.
Kanebako, et al., "Time-multiplexing display module for high-density directional display," SPIE—International Society for Optical Engineering, Proceedings, vol. 6803, Feb. 14, 2008.
Kim, "Full parallax multifocus three-dimensional display using a slanted light source array," Optical Engineering, vol. 50, No. 11, Nov. 1, 2011.
Kim, et al., "Development of three types of multi-focus 3D display," Proc. Of SPIE vol. 8043, May 19, 2011.
Maimone, et al., "High Efficiency Near-Eye Light Field Display," ACM Trans. Graph, article, Nov. 1, 2013.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Tanriverdi and Jacob, "Interacting With Eye Movements in Virtual Environments," Department of Electrical Engineering and Com-

(56) References Cited

OTHER PUBLICATIONS puter Science, Tufts University, Medford, MA—paper/Proc. ACM CHI 2000 Human Factors in Computing Systems Conference, pp. 265-272, Addison-Wesley/ACM Press (2000).

* cited by examiner a)

b)

SYSTEM AND METHOD FOR PRESENTING IMAGE CONTENT ON MULTIPLE DEPTH PLANES BY PROVIDING MULTIPLE INTRA-PUPIL PARALLAX VIEWS

PRIORITY CLAIM

This application claims the benefit of priority of U.S. Provisional Application No. 62/411,490, filed on Oct. 21, 2016, which is incorporated herein by reference.

INCORPORATION BY REFERENCE

This application incorporates by reference the entirety of each of the following patent applications: U.S. application Ser. No. 14/555,585 filed on Nov. 27, 2014; U.S. application Ser. No. 14/690,401 filed on Apr. 18, 2015; U.S. application Ser. No. 14/212,961 filed on Mar. 14, 2014; U.S. application Ser. No. 14/331,218 filed on Jul. 14, 2014; U.S. application Ser. No. 15/072,290 filed on Mar. 16, 2016; and U.S. Provisional Application No. 62/156,809, filed on May 4, 2015.

BACKGROUND

Field

The present disclosure relates to optical devices, including augmented reality and virtual reality imaging and visualization systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by, which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

In some embodiments, a head-mounted display system is provided. The display system comprises a frame configured to mount on a viewer; a light source; a spatial light modulator configured to modulate light from the light source; and projection optics mounted on the frame and configured to direct light from the spatial light modulator into an eye of a viewer. The display system is configured to display a virtual object on a depth plane by injecting a set of parallactically-disparate intra-pupil images of the object into the eye.

In some other embodiments, a method is provided for displaying image content. The method comprises providing a spatial light modulator; providing a light source configured to output light to the spatial light modulator from a plurality of different light output locations; and displaying a virtual object on a depth plane by temporally sequentially injecting a set of parallactically-disparate intra-pupil images of the virtual object into an eye of a viewer. Each of the intra-pupil images is formed by outputting light from the light source to the spatial light modulator, wherein the light is outputted from one or more associated light output locations of the light source; modulating the light with the spatial light modulator to form an intra-pupil image corresponding to the one or more associated light output locations; and propagating the modulated light to the eye. The one or more associated light output locations for each intra-pupil image is distinct from the one or more associated light output locations for others of the intra-pupil images.

In yet other embodiments, a display system is provided. The display system comprises a light source comprising a plurality of spatially distinct light output locations; a spatial light modulator configured to modulate light from the light source; and projection optics mounted on the frame and configured to direct light from the spatial light modulator into an eye of a viewer. The display system is configured to display a virtual object on a depth plane by temporally sequentially injecting a set of parallactically-disparate intra-pupil images of the object into the eye.

In some other embodiments, a method is provided for displaying image content. The method comprises providing a head-mounted display comprising a light source and a spatial light modulator. The method further comprises displaying a virtual object on a depth plane by injecting, within a flicker fusion threshold, a set of parallactically-disparate intra-pupil images of the virtual object from the display into an eye of a viewer.

In addition, various innovative aspects of the subject matter described in this disclosure may be implemented in the following embodiments:

1. A method for displaying image content, the method comprising:
   providing a spatial light modulator;
   providing a light source configured to output light to the spatial light modulator from a plurality of different light output locations; and
   displaying a virtual object on a depth plane by temporally sequentially injecting a set of parallactically-disparate intra-pupil images of the virtual object into an eye of a viewer, wherein each of the intra-pupil images is formed by:
   outputting light from the light source to the spatial light modulator, wherein the light is outputted from one or more associated light output locations of the light source;

modulating the light with the spatial light modulator to form an intra-pupil image corresponding to the one or more associated light output locations; and propagating the modulated light to the eye, wherein the one or more associated light output locations for each intra-pupil image is distinct from the one or more associated light output locations for others of the intra-pupil images.

2. The method of Embodiment 1, wherein activating the one or more associated light-emitting regions comprises selecting the one or more associated light-emitting regions based upon the depth plane, wherein a physical separation between light-emitting regions for the intra-pupil images increases with decreasing distance of the depth plane to the viewer.

3. The method of any of Embodiments 1-2, wherein light rays forming each of the parallactically-disparate image are collimated, wherein the depth plane is at less than optical infinity.

4. The method of any of Embodiments 1-3, wherein injecting the set of parallactically-disparate intra-pupil images is conducted within a timeframe below the flicker fusion threshold of the viewer.

5. The method of Embodiment 4, wherein the flicker fusion threshold is 1/60 of a second.

6. The method of any of Embodiments 1-5, further comprising an eye tracking sensor configured to track a gaze of the eye, wherein displaying the virtual object comprises:

determining a gaze of the eye using the eye tracking sensor; and selecting content for the intra-pupil images based upon the determined gaze of the eye.

7. The method of any of Embodiments 1-6, further comprising projection optics configured to direct modulated light from the spatial light modulator to the eye.

8. The method of any of Embodiments 1-7, wherein the one or more associated light-emitting regions for the intra-pupil images partially overlap.

9. The method of any of Embodiments 1-8, further comprising changing a position of the one or more associated light-emitting regions during injection of at least one of the intra-pupil images into the eye.

10. A display system configured to perform the method of any of Embodiments 1-9.

11. A method for displaying image content, the method comprising:

providing a head-mounted display comprising:
a light source; and
a spatial light modulator; and displaying a virtual object on a depth plane by injecting, within a flicker fusion threshold, a set of parallactically-disparate intra-pupil images of the virtual object from the display into an eye of a viewer.

12. The method of Embodiment 11, wherein injecting the set of parallactically-disparate intra-pupil images comprises temporally sequentially injecting individual ones of the intra-pupil images into an eye of a viewer.

13. The method of Embodiment 11, wherein injecting the set of parallactically-disparate intra-pupil images comprises simultaneously injecting multiple ones of the intra-pupil images.

14. The method of Embodiment 13, wherein injecting the set of parallactically-disparate intra-pupil images comprises temporally sequentially injecting multiple intra-pupil images at a time.

15. The method of any of Embodiments 11-14, wherein the light beams forming the intra-pupil images are collimated.

16. The method of any of Embodiments 11-14, wherein the light beams forming the intra-pupil images have divergent wavefronts.

17. The method of any of Embodiments 11-16, wherein the light source comprises a plurality of selectively activated light-emitting regions, wherein injecting the set of parallactically-disparate intra-pupil images comprises activating a different light emitting region for each intra-pupil image.

18. The method of any of Embodiments 11-17, wherein the light source is configured to output light from a plurality of distinct light output locations, further comprising jittering the light output locations during injection of at least one of the intra-pupil images into the eye.

19. A display system configured to perform the method of any of Embodiments 11-18.

20. A head-mounted display system comprising:
a frame configured to mount on a viewer;
a light source;
a spatial light modulator configured to modulate light from the light source; and
projection optics mounted on the frame and configured to direct light from the spatial light modulator into an eye of a viewer,
wherein the display system is configured to display a virtual object on a depth plane by injecting a set of parallactically-disparate intra-pupil images of the object into the eye.

21. The display system of Embodiment 20, wherein the display system is configured to temporally multiplex display of individual intra-pupil images.

22. The display system of any of Embodiments 20-21, wherein the display system is configured to spatially multiplex display of the intra-pupil images.

23. The display system of any of Embodiments 20-22, wherein the display system is configured to temporally multiplex display of a plurality of spatially-multiplexed intra-pupil images.

24. The display system of any of Embodiments 20-23, wherein the projection optics comprises a waveguide comprising incoupling optical elements and outcoupling optical elements.

25. The display system of Embodiment 24, wherein the projection optics comprises a plurality of waveguides, wherein each waveguide is configured to output light of a different component color than other waveguides of the plurality of waveguides.

26. The display system of any of Embodiments 20-25, wherein the light source comprises a plurality of selectively-activated light-emitting regions.

27. The display system of Embodiment 26, wherein the light source comprises at least one of a light-emitting diode array and a spatial light modulator.

28. The display system of Embodiment 8, wherein the light-emitting diode array comprises an organic light-emitting diode array or an inorganic light-emitting diode array.

29. The display system of Embodiment 27, wherein the spatial light modulator light source comprises a liquid crystal array or a digital light processing (DLP) chip.

30. The display system of any of Embodiments 20-29, wherein the display system is configured to change a position of activated light-emitting regions during injection of at least one of the intra-pupil images into the eye.

31. The display system of any of Embodiments 20-25, wherein the light source comprises:
  a light emitter; and
  an actuator configured to direct light to the spatial light modulator along different paths.

32. The display system of Embodiment 31, wherein the actuator is a dual-axis galvanometer.

33. The display system of Embodiment 31, wherein the light source is a fiber scanner.

34. The display system of any of Embodiments 20-33, wherein the spatial light modulator configured to modulate light from the light source comprises an LCOS panel.

35. The display system of any of Embodiments 20-34, further comprising an eye tracking sensor configured to track a gaze of the eye, wherein the display system is configured to:
  determine a gaze of the eye using the eye tracking sensor; and
  select content for the intra-pupil images based upon the determined gaze of the eye.

36. The display system of any of Embodiments 20-35, wherein the display system is configured to synchronize a light output location of the light source with image content provided by the spatial light modulator.

37. The display system of any of Embodiments 20-36, further comprising an optical mechanism between the spatial light modulator and the projection optics, wherein the optical mechanism is configured to direct light from different locations of the spatial light modulator to projection optics at different angles.

38. The display system of Embodiment 37, wherein the optical mechanism comprises one or more of a prism or a lens structure.

39. The display system of Embodiment 38, wherein the lens structure is a lenslet array.

40. A display system comprising:
  a light source comprising a plurality of spatially distinct light output locations;
  a spatial light modulator configured to modulate light from the light source; and
  projection optics mounted on the frame and configured to direct light from the spatial light modulator into an eye of a viewer,
  wherein the display system is configured to display a virtual object on a depth plane by temporally sequentially injecting a set of parallactically-disparate intra-pupil images of the object into the eye.

41. The display system of Embodiment 40, configured to output light from different light output locations of the light source for different intra-pupil images.

42. The display system of Embodiment 41, configured to vary a lateral separation between the light output locations based upon a distance of the depth plane from the eye of the viewer.

43. The display system of any of Embodiments 41-42, configured to increase the lateral separation between light output locations with increases in the distance of the depth plane from the eye of the viewer.

44. The display system of any of Embodiments 41-42, wherein the display system is configured to change the light output locations during injection of at least one of the intra-pupil images into the eye.

DETAILED DESCRIPTION

Figure 1:
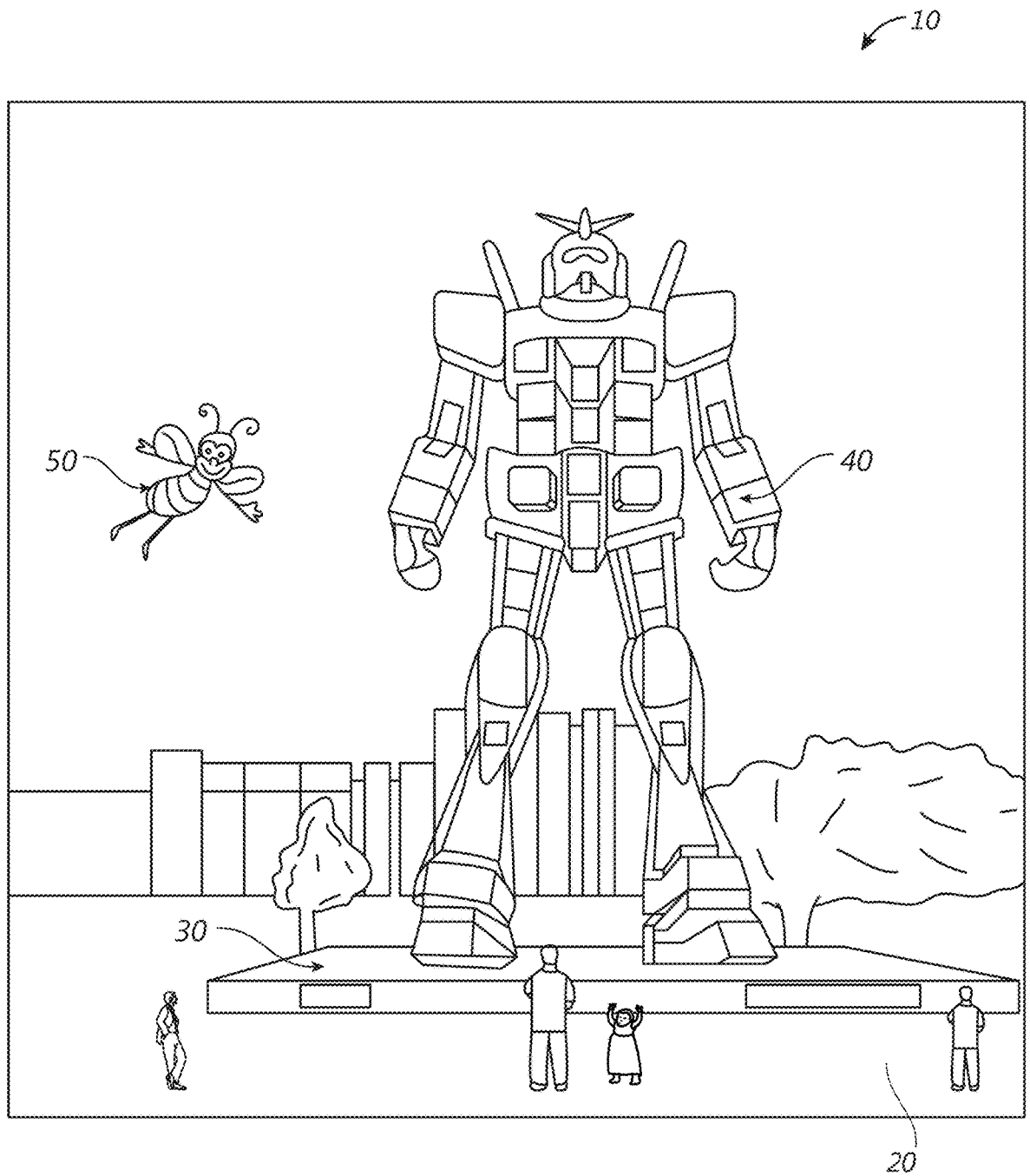
FIG. 1 illustrates a user's view of augmented reality (AR) through an AR device.

The human visual system may be made to perceive images presented by a display as being "3-dimensional" by providing slightly different presentations of the image to each of a viewer's left and right eyes. Depending on the images presented to each eye, the viewer perceives a "virtual" object in the images as being at a selected distance (e.g., at a certain "depth plane") from the viewer. Simply providing different presentations of the image to the left and right eyes, however, may cause viewer discomfort. As discussed further herein, viewing comfort may be increased by causing the eyes to accommodate to the images similarly to the accommodation that would occur if the viewer were viewing a real object at that depth plane on which the virtual object is placed.

The proper accommodation for a virtual object on a given depth plane may be elicited by presenting images to the eyes with light having a wavefront divergence that matches the wavefront divergence of light coming from a real object on that depth plane. Some display systems use distinct structures having distinct optical powers to provide the appropriate wavefront divergence. For example, one structure may provide a specific amount of wavefront divergence (to place virtual objects on one depth plane) and another structure may provide a different amount of wavefront divergence (to place virtual objects on a different depth plane). Thus, there may be a one-to-one correspondence between physical structures and the depth planes in these display systems. Due to the need for a separate structure for each depth plane, such display systems may be bulky and/or heavy, which may be undesirable for some applications, such as portable head-mounted displays. In addition, such display systems may be limited in the numbers of different accommodative responses they may elicit from the eyes, due to practical limits on the number of structures of different optical powers that may be utilized.

It has been found that a continuous wavefront, e.g. a continuous divergent wavefront, may be approximated by injecting parallactically-disparate intra-pupil images directed into an eye. In some embodiments, a display system may provide a range of accommodative responses without requiring a one-to-one correspondence between optical structures in the display and the accommodative response. For example, the same optical projection system may be utilized to output light with a selected amount of perceived wavefront divergence, corresponding to a desired depth plane, by injecting a set of parallactically-disparate intra-pupil images into the eye. These images may be referred to as "parallactically-disparate" intra-pupil images since each image may be considered to be a different parallax view of the same virtual object or scene, on a given depth plane. These are "intra-pupil" images since a set of images possessing parallax disparity is projected into the pupil of a single eye, e.g., the right eye of a viewer. Although some overlap may occur, the light beams forming these images will have at least some areas without overlap and will impinge on the pupil from slightly different angles. In some embodiments, the other eye of the viewer, e.g., the left eye, may be provided with its own set of parallactically-disparate intra-pupil images. The sets of parallactically-disparate intra-pupil images projected into each eye may be slightly different, e.g., the images may show slightly different views of the same scene due to the slightly different perspectives provided by each eye.

The wavefronts of light forming each of the intra-pupil images projected into a pupil of an eye of a view, in the aggregate, may approximate a continuous divergent wavefront. The amount of perceived divergence of this approximated wavefront may be varied by varying the amount of parallax disparity between the intra-pupil images, which varies the angular range spanned by the wavefronts of light forming the intra-pupil images. Preferably, this angular range mimics the angular range spanned by the continuous wavefront being approximated. In some embodiments, the wavefronts of light forming the intra-pupil images are collimated or quasi-collimated.

In some embodiments, the display system utilizes a light source that is configured to output light from a plurality of distinct light output locations. For example, the light source may comprise a plurality of selectively activated light-emitting regions, with each region being a discrete light output location. The amount of parallax disparity between the intra-pupil images may be varied by changing the light output locations for each image. It will be appreciated that light from a given light output location may propagate through the display system to the eye along one path, and that light from a different light output location on the light source may propagate through the display system to the eye along a different path. Consequently, spatial differences in the light output locations may translate into differences in the paths that the light takes to the eye. The different paths may correspond to different amounts of parallax disparity. Advantageously, in some embodiments, the amount of parallax disparity may be selected by selecting the amount of spatial displacement or separation between the light output locations of the light source.

In some embodiments, as noted above, the light source may comprise a plurality of selectively activated light-emitting regions, each of which corresponds to a distinct light output location. The light-emitting regions may be disposed on a plane and form a 2D light emitter array. In some other embodiments, the light source may comprise a linear transfer lens such as a F-theta (F-θ or F-tan θ) lens, a common or shared light emitter, and an actuator to direct the light emitted by the light emitter along different paths through the F-theta lens. The light exits the light source at different locations through the F-theta lens, which focuses the exiting light onto an image plane. Light exiting the F-theta lens at different locations is also disposed at different locations on the image plane, and the image plane may be considered to provide a virtual 2D light emitter array. Consequently, the individual regions of the light emitter array, and the locations at which light from the linear transfer lens passes through the image plane may both be referred to herein as light output locations of the light source.

In some embodiments, the actuator may be part of a dual axis galvanometer comprising a plurality (e.g., a pair) of mirrors that are independently actuated on different axes to direct light from the light emitter along the desired path of propagation. In some other embodiments, the light source may comprise a fiber scanner and the actuator may be an actuator configured to move the fiber of the fiber scanner. The light source may also comprise or be in communication with a processing module which synchronizes the output of light by the light source with the location of the mirrors or fiber, and with the intra-pupil image to be displayed. For example, the mirrors or fiber may move along a known path and the light emitter may be controlled by the processing module to emit light when the mirrors or fiber are at a position corresponding to a desired light output location for a particular intra-pupil image (and the parallax disparity associated with that image), as discussed further herein.

The display system may also comprise a spatial light modulator between the light source and projection optics for injecting light into the eye. The spatial light modulator may be configured to modulate the light from the light source, to encode image information in that light stream to form an intra-pupil image. Preferably, the images are injected into the eye through a projection optic that simultaneously provides an image of the spatial light modulator plane at or near optical infinity, or some other chosen "home plane," and also provides an image of the light source at or near the viewer's pupil. Thus, both image content and precise amounts of parallax disparity may be provided to the eye.

In some embodiments, the same spatial light modulator may be used to modulate light to form various intra-pupil images to be provided to an eye. In some such embodiments, the active light output locations (the light output locations from which light is actively propagating at a given point in time) may be synchronized with the modulation by the spatial light modulator. For example, activation of a light output location corresponding to one intra-pupil image may be synchronized, or simultaneous, with the activation of display elements in the spatial light modulator, with the display elements configured to form the intra-pupil image corresponding to a particular light-emitting region. Once another light output location corresponding to a second intra-pupil image is activated, the appropriate, possibly different, display elements in the spatial light modulator may be activated to form that second intra-pupil image. Additional intra-pupil images may be formed by synchronizing activation of the light output locations and the image content provided by the spatial light modulator. This time-based sequential injection of intra-pupil images to the eye may be referred to as temporal multiplexing or temporally multiplexed display of the intra-pupil images. Also, it will be appreciated that an active or activated light output location is a location from which light is actively propagating from the light source to the spatial light modulator used to form the intra-pupil images.

In some other embodiments, spatial multiplexing may be utilized. In such embodiments, different areas of the spatial light modulator (e.g. different pixels) may be dedicated to forming different intra-pupil images. An optical mechanism may be provided between the spatial light modulator and the projection optic to direct light from different regions such that the light propagates in different directions through the projection optic. Examples of suitable optical mechanisms include lenslet arrays. Consequently, different intra-pupil images may be formed and provided to the eye simultaneously, with the parallax disparity determined by the locations of the pixels forming the images and with the optical mechanism directing the propagation of light from those pixels. In some embodiments, a light source without selectively activated light-emitting regions (e.g., a point light source) may be utilized to generate light for the display system, since the parallax disparity may be set using the spatial light modulator in conjunction with the optical mechanism.

In some other embodiments, both spatial and temporal multiplexing may be utilized. In such embodiments, the display system may include a light source with selectively activated light output locations, in addition to the above-noted optical mechanism and the formation of different intra-pupil images in different areas of the spatial light modulator. Parallax disparity may be provided using both the selective activation of light output locations and the optical mechanism in conjunction with the simultaneous formation of different intra-pupil images in different the locations of the spatial light modulator In embodiments with temporal multiplexing, the set of intra-pupil images for approximating a particular continuous wavefront are preferably injected into the eye too rapidly for the human visual system to detect that the images were provided at different times. Without being limited by theory, the visual system may perceive images formed on the retina within a flicker fusion threshold as being present simultaneously. In some embodiments, approximating a continuous wavefront may include sequentially injecting beams of light for each of a set of intra-pupil images into the eye, with the total duration for injecting all of the beams of light being less than the flicker fusion threshold, above which the human visual system will perceive images as being separately injected into the eye. As an example, the flicker fusion threshold may be about 1/60 of a second. It will be appreciated that each set of images may consist of a particular number of parallax views, e.g., two or more views, three or more views, four or more views, etc. and all of these views are provided within the flicker fusion threshold.

Preferably, the display system has a sufficiently small exit pupil that the depth of field provided by light forming individual intra-pupil images is substantially infinite and the visual system operates in an "open-loop" mode in which the eye is unable to accommodate to an individual intra-pupil image. In some embodiments, the light beams forming individual images occupy an area having a width or diameter less than about 0.5 mm when incident on the eye. It will be appreciated, however, that light beams forming a set of intra-pupil images are at least partially non-overlapping and preferably define an area larger than 0.5 mm, to provide sufficient information to the lens of the eye to elicit a desired accommodative response based on the wavefront approximation formed by the wavefronts of the light forming the intra-pupil images.

Without being limited by theory, the area defined by a set of beams of light may be considered to mimic a synthetic aperture through which an eye views a scene. It will be appreciated that viewing a scene through a sufficiently small pinhole in front of the pupil provides a nearly infinite depth of field. Given the small aperture of the pinhole, the lens of the eye is not provided with adequate scene sampling to discern distinct depth of focus. As the pinhole enlarges, additional information is provided to the eye's lens, and natural optical phenomena allow a limited depth of focus to be perceived. Advantageously, the area defined by the set of beams of light and the corresponding sets of parallactically-disparate intra-pupil images may be made larger than the pinhole producing the infinite depth of field and the multiple intra-pupil images may produce an approximation of the effect provided by the enlarged pinhole noted above.

As discussed herein, in some embodiments, the different angles at which the light beams propagate towards the pupil may be provided using a light source having a plurality of selectively activated light output locations that output light to a spatial light modulator that modulates the light to form the images. It will be appreciated that light from different light output locations of the light source will take different paths to the spatial light modulator, which in turn will take a different path from the spatial light modulator to the output pupil of the projection optic and thus to the viewer's eyes.

Consequently, lateral displacement of the active light output locations translate into angular displacement in the light leaving the spatial light modulator and ultimately propagating towards the viewer's pupil through the projection optic. In some embodiments, increases in lateral displacement between the activated light-emitting regions may be understood to translate to increases in angular displacement as measured with respect to the spatial light modulator plane. In some embodiments, each of the intra-pupil images may be formed by outputting light from a different light output location, thereby providing the angular displacement between the beams of light forming each of the images.

In some embodiments, the light source and/or light output locations of the light source may change position or jitter within a single parallax image (intra-pupil image) display episode. For example, the light source and/or light emitting regions may physically move and/or different light output locations (e.g., the different light emitters of an array of light emitters) may be activated to provide the desired change in position while displaying an intra-pupil image. The speed of displacement or jitter may be higher than the update rate of the parallax image on the spatial light modulator. The jittered displacement may be in any direction, including torsional, depending on the perceptual effect that is desired.

In some embodiments, the display system may include a combiner eyepiece, which allows virtual image content to be overlaid with the viewer's view of the world, or ambient environment. For example, the combiner eyepiece may be an optically transmissive waveguide that allows the viewer to see the world. In addition, the waveguide may be utilized to receive, guide, and ultimately output light forming the intra-pupil images to the viewer's eyes. Because the waveguide may be positioned between the viewer and the world, the light outputted by the waveguide may be perceived to form virtual images that are placed on depth planes in the world. In essence, the combiner eyepiece allows the viewer to receive a combination of light from the display system and light from the world.

In some embodiments, the display system may also include an eye tracking system to detect the viewer's gaze direction. Such an eye tracking system allows appropriate content to be selected based upon where the viewer is looking.

Advantageously, by shifting the mechanism for providing divergent wavefronts from multiple, discrete light output structures, which create wavefronts with a particular associated divergence, to a single structure that can create an arbitrary amount of divergence, the physical size and complexity of the system may be reduced; that is, some of the output structures may be eliminated. In addition, it may be possible to place virtual content on a larger number of depth planes they would be practical if each depth plane required a dedicated structure to create a given wavefront divergence. This increase in the number of depth planes may provide a more realistic and comfortable viewing experience for the viewer. In addition, in some embodiments, light from each spatial light modulator pixel may remain nominally collimated, thereby facilitating integration of a projection system having that spatial light modulator with combiner eyepieces that utilize collimated pixel light.

Reference will now be made to the figures, in which like reference numerals refer to like parts throughout.

Figure 2:
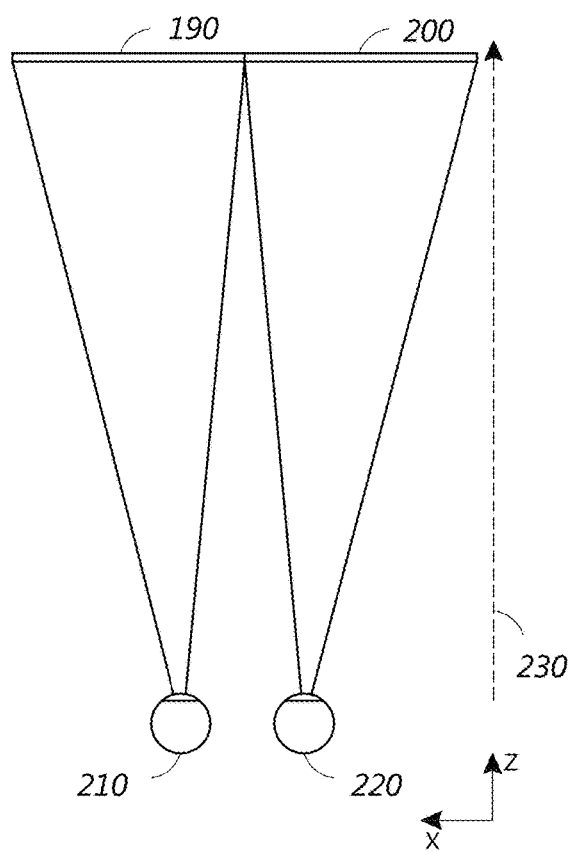
FIG. 2 illustrates a conventional display system for simulating three-dimensional imagery for a user.

As discussed herein, the perception of an image as being "three-dimensional" or "3-D" may be achieved by providing slightly different presentations of the image to each eye of the viewer. FIG. 2 illustrates a conventional display system for simulating three-dimensional imagery for a user. Two distinct images 190, 200—one for each eye 210, 220—are outputted to the user. The images 190, 200 are spaced from the eyes 210, 220 by a distance 230 along an optical or z-axis that is parallel to the line of sight of the viewer. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

It will be appreciated, however, that the human visual system is more complicated and providing a realistic perception of depth is more challenging. For example, many viewers of conventional "3-D" display systems find such systems to be uncomfortable or may not perceive a sense of depth at all. Without being limited by theory, it is believed that viewers of an object may perceive the object as being "three-dimensional" due to a combination of vergence and accommodation. Vergence movements (i.e., rotation of the eyes so that the pupils move toward or away from each other to converge the lines of sight of the eyes to fixate upon an object) of the two eyes relative to each other are closely associated with focusing (or "accommodation") of the lenses and pupils of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, a change in vergence will trigger a matching change in accommodation of lens shape and pupil size, under normal conditions. As noted herein, many stereoscopic or "3-D" display systems display a scene using slightly different presentations (and, so, slightly different images) to each eye such that a three-dimensional perspective is perceived by the human visual system. Such systems are uncomfortable for many viewers, however, since they, among other things, simply provide a different presentation of a scene, but with the eyes viewing all the image information at a single accommodated state, and work against the "accommodation-vergence reflex." Display systems that provide a better match between accommodation and vergence may form more realistic and comfortable simulations of three-dimensional imagery, contributing to increased duration of wear.

Figure 3:
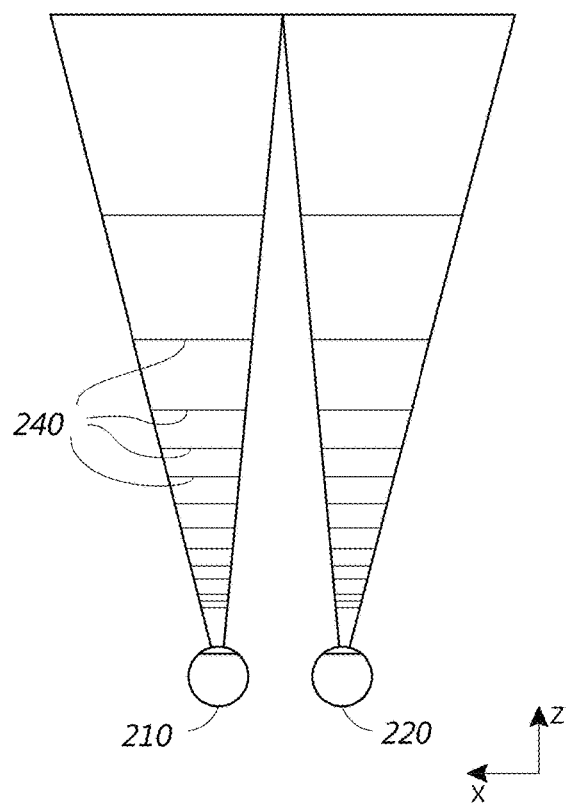
FIG. 3 illustrates aspects of an approach for simulating three-dimensional imagery using multiple depth planes.

FIG. 4 illustrates aspects of an approach for simulating three-dimensional imagery using multiple depth planes. With reference to FIG. 3, objects at various distances from eyes 210, 220 on the z-axis are accommodated by the eyes 210, 220 so that those objects are in focus; that is, the eyes 210, 220 assume particular accommodated states to bring into focus objects at different distances along the z-axis. Consequently, a particular accommodated state may be said to be associated with a particular one of depth planes 240, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 210, 220, with the presentations of the image also being different for different depth planes. While shown as being separate for clarity of illustration, it will be appreciated that the fields of view of the eyes 210, 220 may overlap, for example, as distance along the z-axis increases. In addition, while shown as flat for ease of illustration, it will be appreciated that the contours of a depth plane may be curved in physical space, such that all features in a depth plane are in focus with the eye in a particular accommodated state.

Figure 4A:
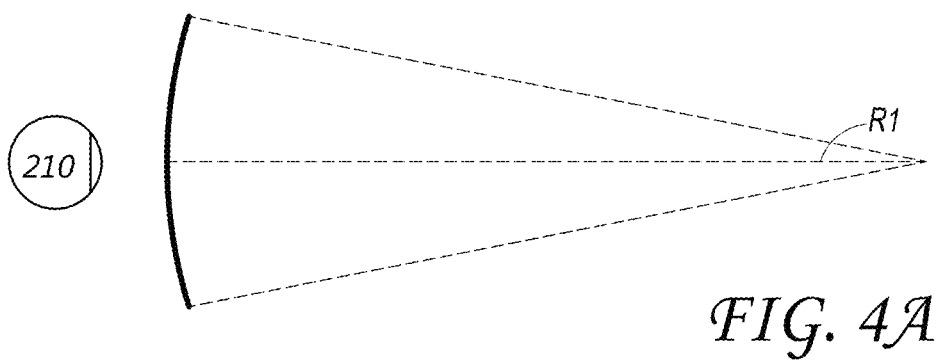
FIGS. 4A-4C illustrate relationships between curvature and focal distance.
Figure 4B:
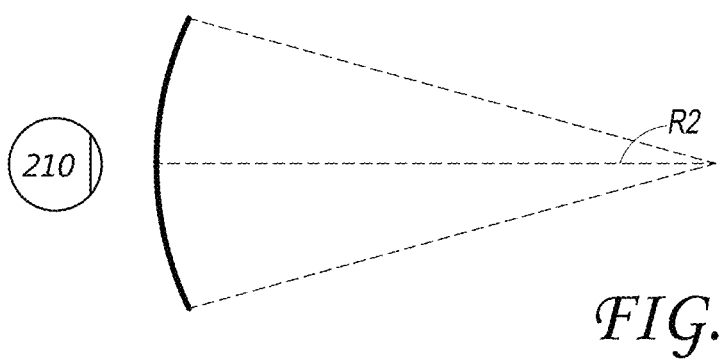
Figure 4C:
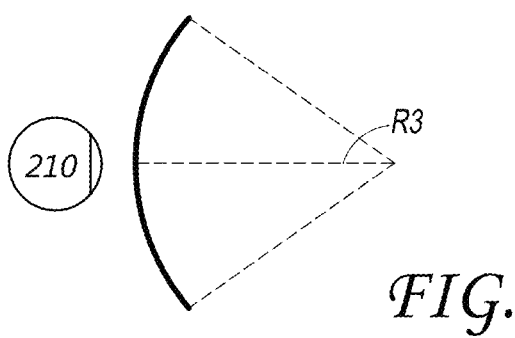

The distance between an object and the eye 210 or 220 may also change the amount of divergence of light from that object, as viewed by that eye. FIGS. 4A-4C illustrate relationships between distance and the divergence of light rays. The distance between the object and the eye 210 is represented by, in order of decreasing distance, R1, R2, and R3. As shown in FIGS. 4A-4C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. Consequently, at different depth planes, the degree of divergence of light rays is also different, with the degree of divergence increasing with decreasing distance between depth planes and the viewer's eye 210. While only a single eye 210 is illustrated for clarity of illustration in FIGS. 4A-4C and other figures herein, it will be appreciated that the discussions regarding eye 210 may be applied to both eyes 210 and 220 of a viewer.

Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes. The different presentations may be separately focused by the viewer's eyes, thereby helping to provide the user with depth cues based on the accommodation of the eye required to bring into focus different image features for the scene located on different depth planes and/or based on observing different image features on different depth planes being out of focus.

Figure 5:
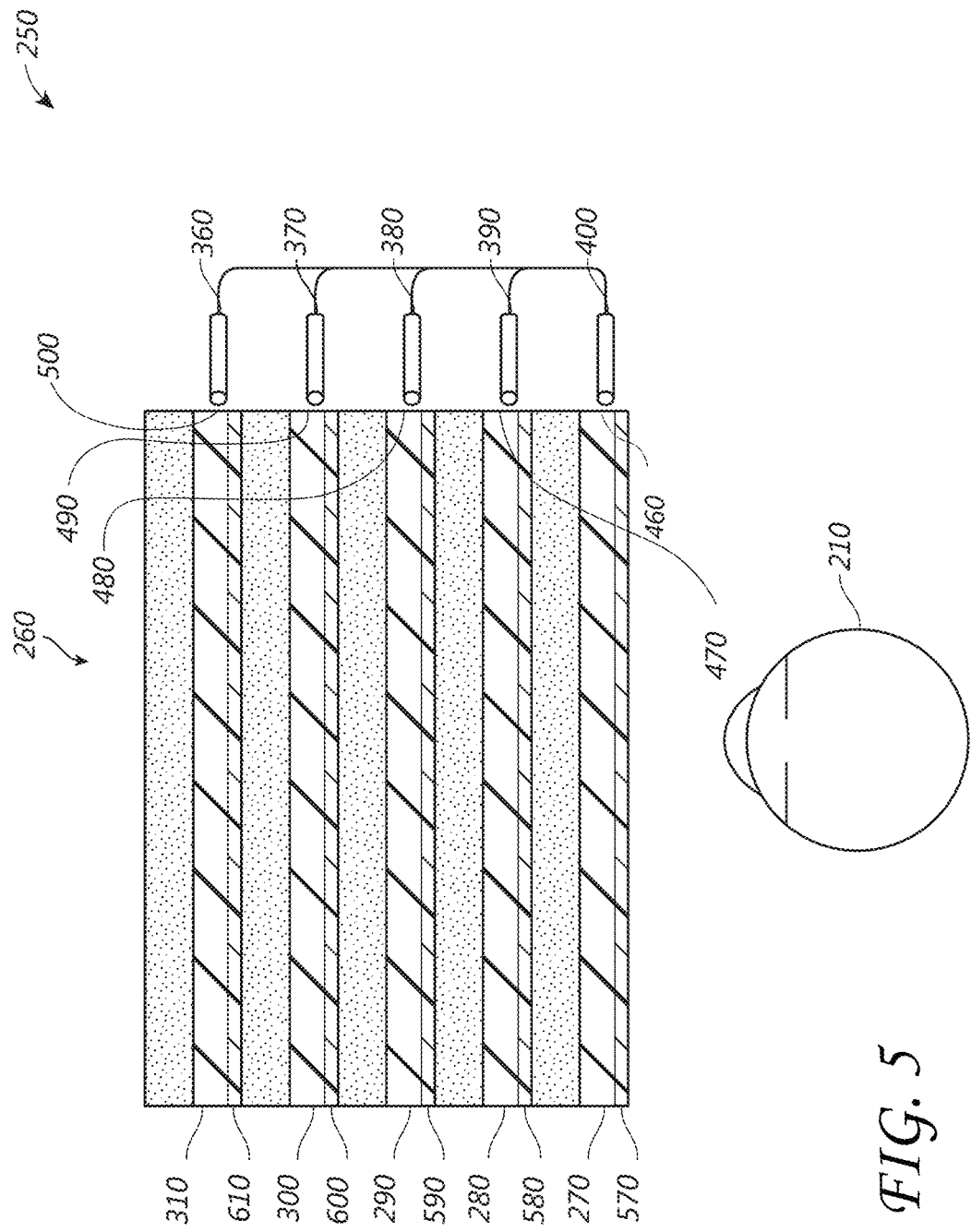
FIG. 5 illustrates an example of a waveguide stack for outputting image information to a user.

Because each depth plane has an associated wavefront divergence, to display image content appearing to be at a particular depth plane, some displays may utilize waveguides that have optical power to output light with a divergence corresponding to that depth plane. A plurality of similar waveguides, but having different optical powers, may be utilized to display image content on a plurality of depth planes. For example, such systems may utilize a plurality of such waveguides formed in a stack. FIG. 5 illustrates an example of a waveguide stack for outputting image information to a user. A display system 250 includes a stack of waveguides 260 that may be utilized to provide three-dimensional perception to the eye/brain using a plurality of waveguides 270, 280, 290, 300, 310 to output image information. Image injection devices 360, 370, 380, 390, 400 may be utilized to inject light containing image information into the waveguides 270, 280, 290, 300, 310. Each waveguide 270, 280, 290, 300, 310 may include a structure (e.g., an optical grating and/or lens 570, 580, 590, 600, 610, respectively) that provides optical power, such that each waveguide outputs light with a preset amount of wavefront divergence, which corresponds to a particular depth plane. Thus, each waveguide 270, 280, 290, 300, 310 places image content on an associated depth plane determined by the amount of wavefront divergence provided by that waveguide.

It will be appreciated, however, that the one-to-one correspondence between a waveguide and a depth plane may lead to a bulky and heavy device in systems in which multiple depth planes are desired. In such embodiments, multiple depth planes would require multiple waveguides. In addition, where color images are desired, even larger numbers of waveguides may be required, since each depth plane may have multiple corresponding waveguides, one waveguide for each component color may be required to form the color images.

Advantageously, various embodiments may provide a simpler display system that approximates a desired continuous wavefront by using discrete light beams that form intra-pupil images that present different parallax views of an object or scene.

Figure 6A:
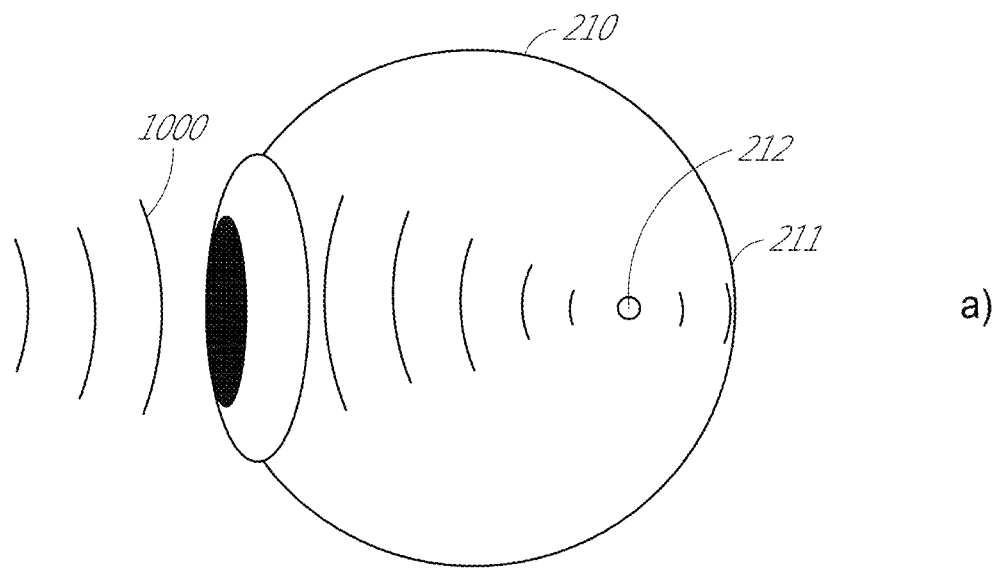
FIG. 6A illustrates pre-accommodation and post-accommodation conditions of an eye to a continuous incoming wavefront.
Figure 6A:
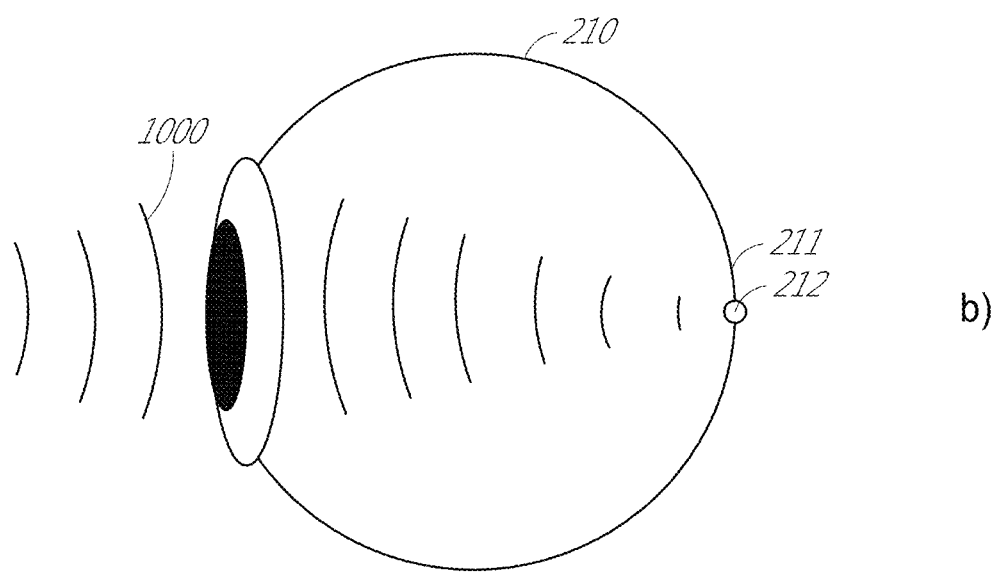

With reference now to FIG. 6A, the pre-accommodation and post-accommodation conditions of an eye 210 upon receiving a continuous input wavefront 1000 are illustrated. Illustration a) shows the pre-accommodation condition, before the visual system brings the wavefront 1000 into focus on the retina 211. Notably, the focal point 212 is not on the retina 211. For example, the focal point 212 may be forward of the retina 211 as illustrated. Illustration b) shows the post-accommodation condition, after the human visual system flexes pupillary musculature of the eye 210 of the viewer to bring the wavefront 1000 into focus on the retina 211. As illustrate, the focal point 212 may be on the retina 211.

Figure 6B:
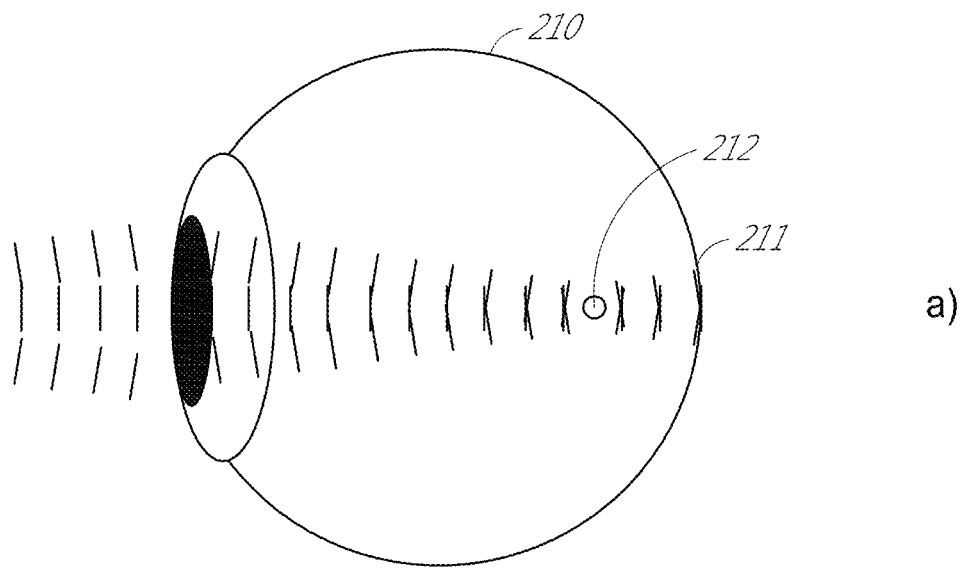
FIG. 6B illustrates pre-accommodation and post-accommodation conditions of an eye to a piecewise approximation of a continuous incoming wavefront.
Figure 6B:
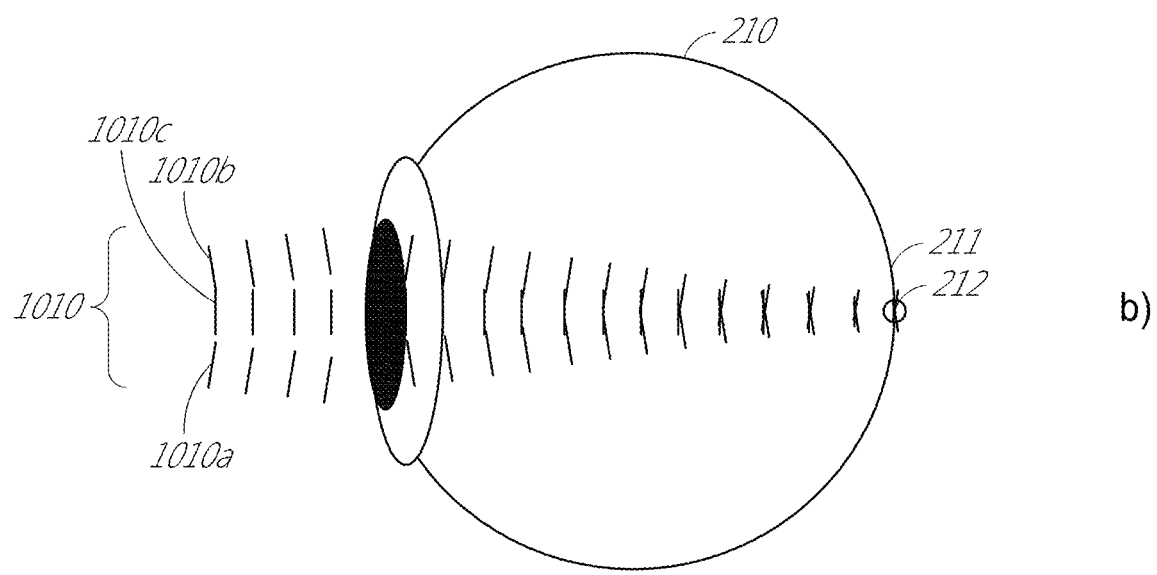

It has been found that a continuous wavefront such as the wavefront 1000 of FIG. 6A may be approximated using a plurality of wavefronts. FIG. 6B illustrates the pre-accommodation and post-accommodation conditions of the eye 210 upon receiving a piecewise approximation of the continuous wavefront 1000 of FIG. 6A. Illustration a) of FIG. 6B shows the pre-accommodation condition and illustration b) shows the post-accommodation condition of the eye 210. The approximation may be formed using a plurality of constituent wavefronts 1010a, 1010b, and 1010c, each of which is associated with separate beams of light. As used herein, references numerals 1010a, 1010b, and 1010c may indicate both a light beam and that light beam's associated wavefront. In some embodiments, the constituent wavefronts 1010a and 1010b may be planar wavefronts, such as formed by a collimated beam of light. As shown in illustration b), the wavefront approximation 1010 formed by the constituent wavefronts 1010a and 1010b are focused by the eye 210 onto the retina 211, with the focal point 212 on the retina 211. Advantageously, the pre- and post-accommodation conditions are similar to that caused by the continuous wavefront 1000 shown in FIG. 6A.

Figure 7A:
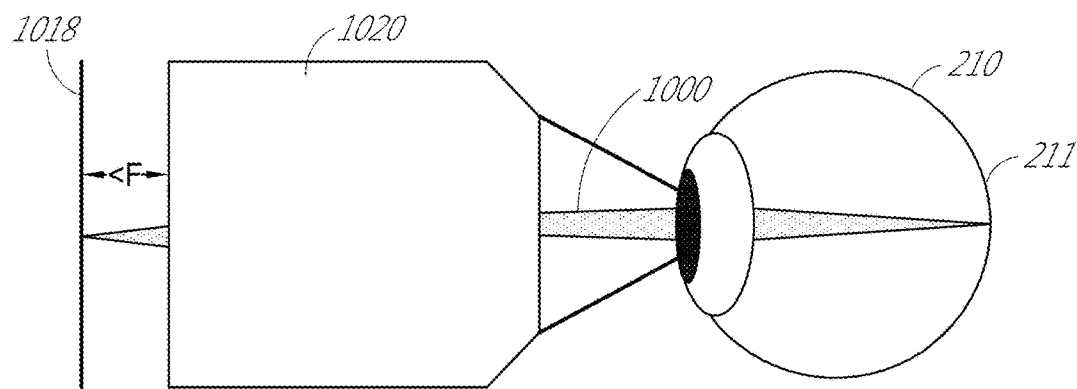
FIG. 7A illustrates an eye accommodating to a divergent wavefront emanating from a finite focal-distance virtual image provided by a projection system.

It will be appreciated that continuous divergent wavefronts may be formed using optical projection systems. FIG. 7A illustrates an eye accommodating to a divergent wavefront emanating from a finite focal-distance virtual image provided by a projection system. The system includes a spatial light modulator 1018 and projection optics 1020 with focal length "F" and an external stop. An image may be formed by the spatial light modulator 1018 and light from the spatial light modulator 1018 containing the image information may be directed through projection optics 1020 to the eye 210. As indicated in FIG. 7A, the spacing (less than F) between the spatial light modulator 1018 and the projection optics 1020 may be chosen such that a divergent wavefront 1000 is outputted towards the eye 210. As noted above regarding FIG. 6A, the eye 210 may then focus the wavefront 1000 on the retina 211.

Figure 7B:
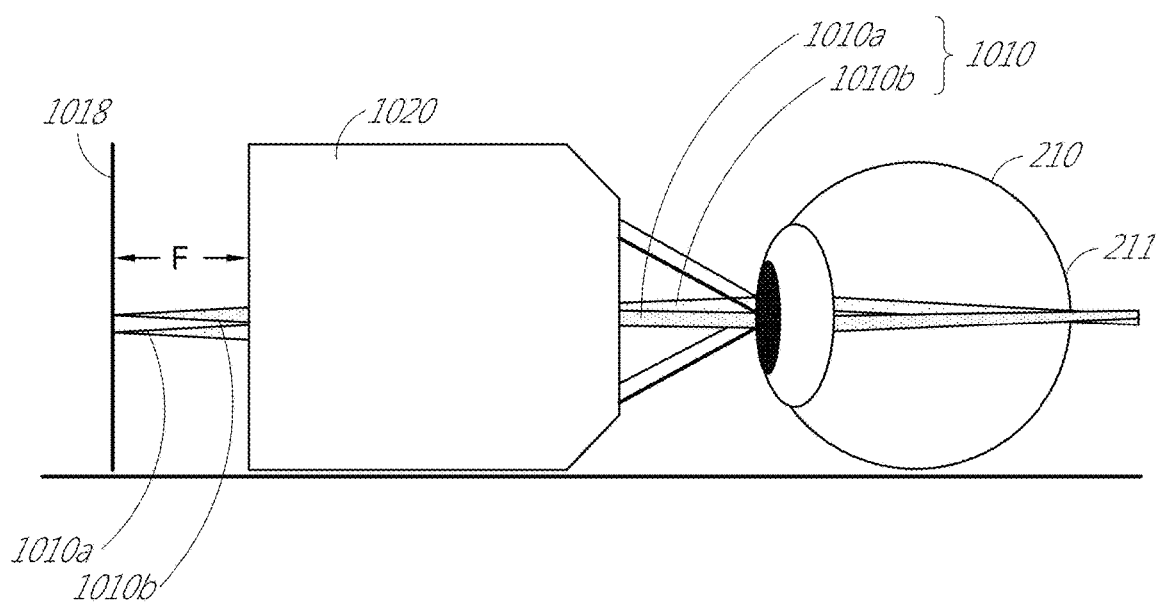
FIG. 7B illustrates a system for forming an approximation of the divergent wavefront of FIG. 7A utilizing wavefront segments formed by infinity-focused virtual images.

FIG. 7B illustrates a system for forming an approximation of the divergent wavefront of FIG. 7A utilizing wavefront segments formed by infinity-focused virtual images. As above, the system includes spatial light modulator 1018 and projection optics 1020. The spatial light modulator 1018 forms two images that are shifted relative to one another. The spatial light modulator 1018 is placed at distance F from the back focal plane of projection optics 1020, which have a back focal length of F. Light beam 1010*a*, containing image information for a first image, propagates through the projection optics 1020 into the eye 210. Light beam 1010*b* containing image information for a second image takes a different path through the projection optics 1020 into the eye 210. As discussed herein, the light beams 1010*a* and 1010*b* may be emitted from different regions of a light source (not illustrated), thereby causing those light beams to illuminate the spatial light modulator 1018 from different angles, which in turn causes images formed by the light beams 1010*a* and 1010*b* to be spatially shifted relative to one another. The light beams 1010*a* and 1010*b* propagate away from the spatial light modulator along paths through the projection optics 1020 and into the eye 210 such that those light beams define an angular range, from one light beam to the other, that matches the angular range of the divergent wavefront 1000 (FIG. 7A). It will be appreciated that the angular separation between light beams 1010*a* and 1010*b* increases with increases in the amount of wavefront divergence that is approximated. In some embodiments, the projection optics 1020 and the spacing between the spatial light modulator 1018 and the projection optics 1020 are configured such that each of the light beams 1010*a* and 1010*b* are collimated.

Figure 8:
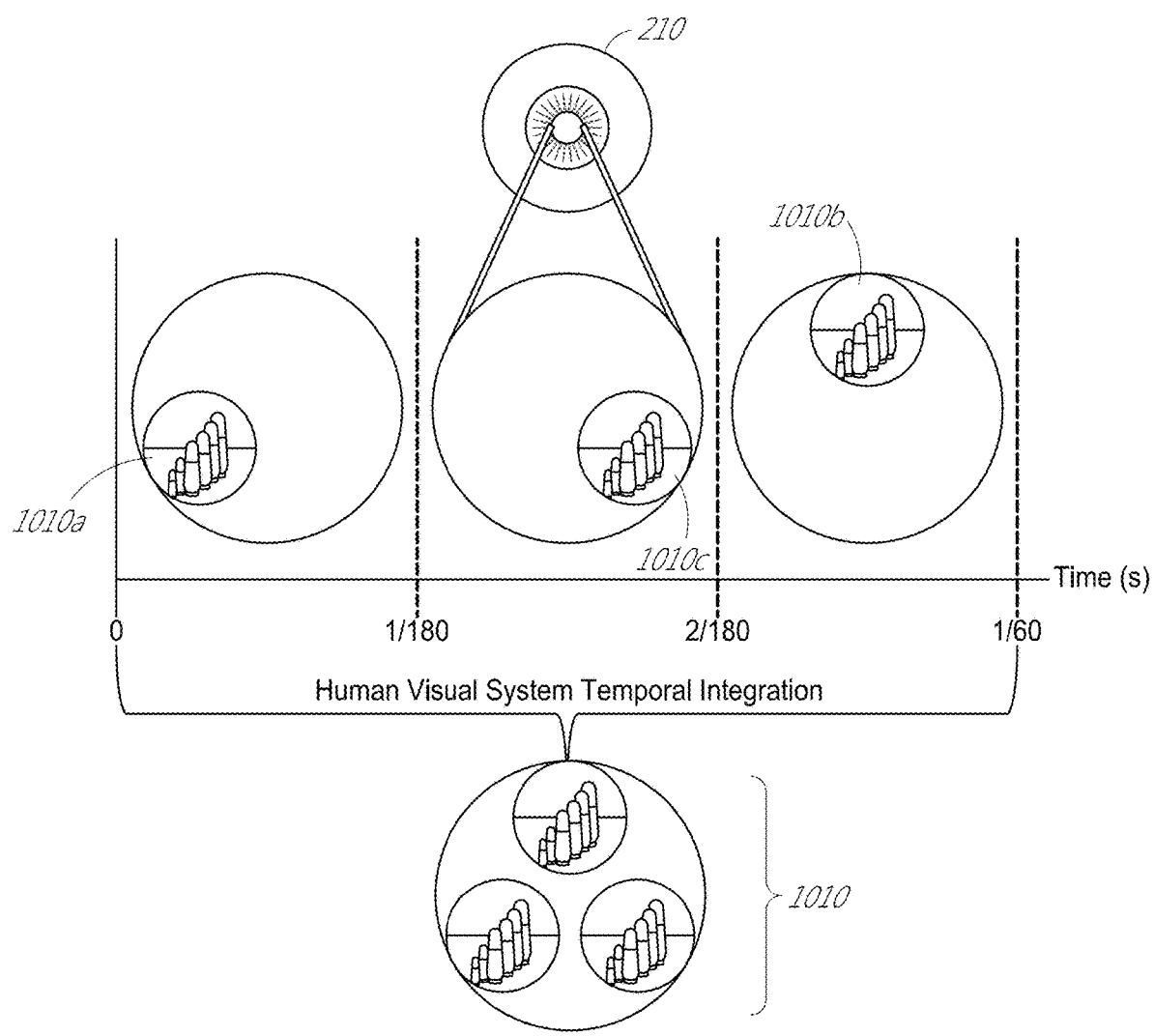
FIG. 8 illustrates examples of parallax views forming the divergent wavefront approximation of FIG. 7B.

With reference now to FIG. 8, examples of parallax views forming the divergent wavefront approximation of FIG. 7B are illustrated. It will be appreciated that each of light beams 1010*a*, 1010*b*, and 1010*c* form a distinct image of one view of the same objects or scene from slightly different perspectives corresponding to the different placements of the images in space. As illustrated, the images may be injected into the eye 210 sequentially at different times. Alternatively, the images may be injected simultaneously if the optical system permits, or the images can be injected in groups, as discussed herein. In some embodiments, the total duration over which light forming all of the images is injected into the eye 210 is less than the flicker fusion threshold of the viewer. For example, the flicker fusion threshold may be 1/60 of a second, and all of the light beams 1010*a*, 1010*b*, and 1010*c* are injected into the eye 210 over a duration less than that flicker fusion threshold. As such, the human visual system integrates all of these images and they appear to the eye 210 as if the light beams 1010*a*, 1010*b*, and 1010*c* were simultaneously injected into that eye 210. The light beams 1010*a*, 1010*b*, and 1010*c* thus form the wavefront approximation 1010.

Figure 9:
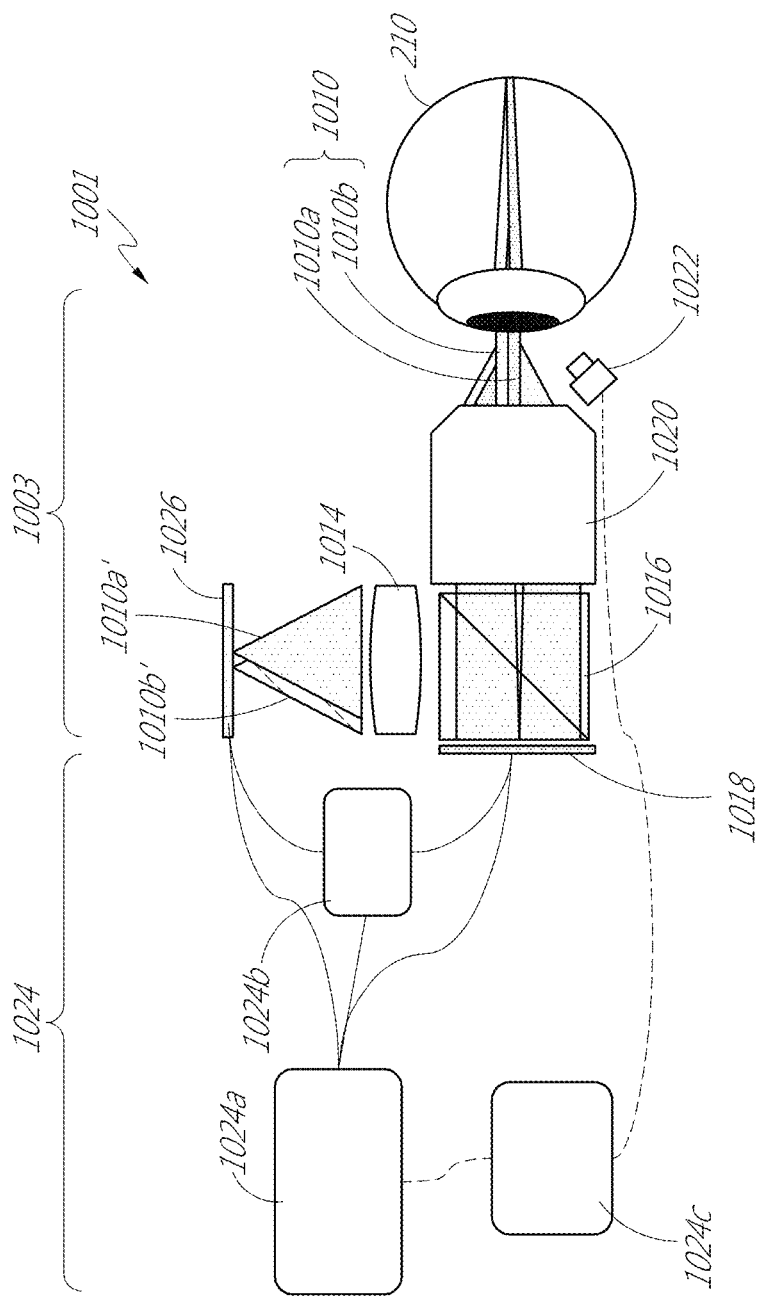
FIG. 9 illustrates an example of a display system comprising a projection system for forming the divergent wavefront approximation of FIG. 7B.

With reference now to FIG. 9, an example of a display system 1001 comprising a projection system 1003 for forming the divergent wavefront approximation 1010 of FIG. 7B is illustrated. The projection system 1003 comprises a light source 1026 configured to output light 1010*a*' and 1010*b*' to a spatial light modulator 1018, which modulates the light to form images showing slightly different parallax views of the same object or scene. The modulated light with the image information then propagates through the relay/projection optics 1020, and is outputted by the relay/projection optics 1020 as light beams 1010*a* and 1010*b* into the eye 210. The projection system 1003 may also include a lens structure 1014, which may be configured to convert the spatial differences in the emission of the light 1010*a*' and 1010*b*' into angular differences in the propagation of that light to the spatial light modulator 1018. The projection system 1003 may further include a polarizing beam splitter 1016 configured to 1) direct light from the light source 1026 to the spatial light modulator 1018; and 2) permit modulated light from the spatial light modulator 1018 to propagate back through the beam splitter 1016 to the relay/projection optics 1020. In some embodiments, the display system 1001 may include an eye tracking device 1022, e.g., a camera, configured to monitor the gaze of the eye. Such monitoring may be used to determine the direction in which the viewer is looking, which may be used to select image content appropriate for that direction. Preferably, the eye tracking device 1022 tracks both eyes of the viewer, or each eye includes its own associated eye tracking device. As a result, vergence of both eyes of the viewer may be tracked and the convergence point of the eyes may be determined to determine in what direction and at what distance the eyes are directed.

It will be appreciated that the light 1010*a*' and 1010*b*' may be outputted by the light source 1026 at different times, the spatial light modulator 1018 may form the different parallax views with the light 1010*a*' and 1010*b*' at different times, and the resultant light beams 1010*a* and 1010*b* may be injected into the eye 210 at different times, as discussed herein.

With continued reference to FIG. 9, the light source 1026 may be a 2D light source having a plurality of selectively-activated light output locations disposed substantially on a plane. In some embodiments, the selectively-activated light output locations may be selectively activated light-emitting regions. For example, the light source 1026 may be a light-emitting diode (LED) array, or a spatial light modulator (e.g., a digital micromirror device such as a digital light processing (DLP) device, a LCOS device, etc.) containing an array of discrete units or light emitters that output light. Examples of LED arrays include organic light-emitting diode (OLED) arrays, and inorganic light-emitting diode (ILED) arrays. In some embodiments, individual light-emitting diodes and/or light modulators in the light source 1026 may constitute a light-emitting region. In some other embodiments, groups of light-emitting diodes and/or light modulators may form light-emitting regions. In such embodiments, there may be some overlap between the light-emitting diodes and/or light modulators of different light-emitting regions although the regions may be considered distinct because the overlap is not complete.

In some other embodiments, the light source 1026 may be configured to focus light onto an image plane to, in effect, provide a virtual 2D light source on that image plane. Different locations on the image plane may be considered to be different light output locations and those locations may be activated by directing light through those locations on the image plane using actuated mirrors or a fiber scanner to steer light from a light emitter. Further details regarding such virtual 2D light sources are provided below in the discussion of FIGS. 19 and 20.

In some embodiments, examples of spatial light modulators 1018 include liquid crystal on silicon (LCOS) panels. As another example, in some other embodiments, spatial light modulator 1018 may comprise a transmissive liquid crystal panel or a MEMs device, such as a DLP.

With continued reference to FIG. 9, the display system 1001 may also include control systems 1024 for determining the timing and the type of image content provided by the display system. In some embodiments, the control system 1024 comprises one or more hardware processors with memory storing programs for controlling the display system 1001. For example, the system 1024 may be configured to control activation of the light-emitting regions of the light source 1026, the actuation of individual pixel elements of the spatial light modulator 1018, and/or the interpretation and reaction of the display system 1001 to data received from the eye tracking device 1022. Preferably, the system 1024 includes a computation module 1024a configured to receive an input regarding a desired depth plane or wavefront divergence and to calculate the appropriate light-emitting regions to activate, in order to form parallax views with the proper amount of disparity for the desired depth plane or wavefront divergence. In addition, computation module 1024a may be configured to determine the appropriate actuation of the pixels of the spatial light modulator 1018 to form images of the desired parallax views. The system 1024 may also include a synchronization module 1024b that is configured to synchronize the activation of particular light-emitting regions of the light source 1026 with modulation of light by the spatial light modulator 1018 to form images to provide the parallax view corresponding to those activated light-emitting regions. In addition, the system 1024 may include an eye tracking module 1024c that receives inputs from the eye tracking device 1022. For example, the eye tracking device 1022 may be a camera configured to image the eye 210. Based on images captured by the eye tracking device 1022, the eye tracking module 1024c may be configured to determine the orientation of the pupil and to extrapolate the line of sight of the eye 210. This information may be electronically conveyed to the computation module 1024a. The computation module 1024a may be configured to select image content based upon the line of sight or the gaze of the eye 210 (preferably also based upon the line of sight or gaze of the other eye of the viewer).

Figure 10:
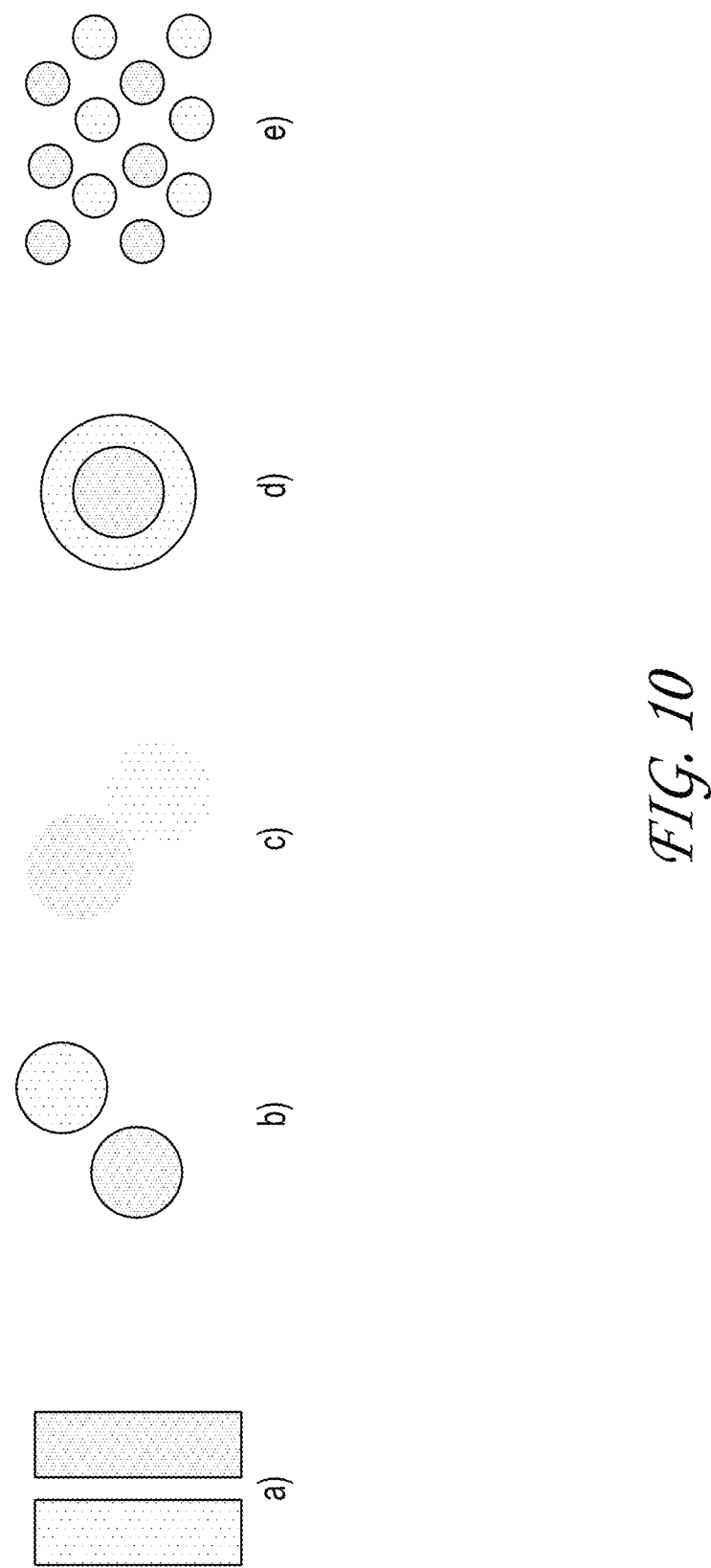
FIG. 10 illustrates examples of sizes, shapes, and distributions for light-emitting regions.

Because the light source 1026 may include arrays of discrete light emitters, the size and shape of the light-emitting regions formed by the light emitters may be varied as desired by activating selected ones of the light emitters. FIG. 10 illustrates examples of sizes, shapes, and distributions for the light-emitting regions. It will be appreciated that the light and dark areas in the figure indicate different emitting regions that are activated for different parallax views. Example a) shows elongated light-emitting regions that are horizontally spaced apart, which may be desirable for horizontal parallax-only driven accommodation. Example b) shows circular light-emitting regions with both horizontal and vertical displacement. Example c) shows light-emitting regions that have a luminance fall-off. Example d) shows light-emitting regions that overlap. Example e) shows light-emitting regions that form arrays. As indicated by the illustrated examples, the light source 1026 (FIG. 9) may include light emitters that are binary (which simply turn on and off) and/or light emitters that incorporate grayscale (which emit light of selectively variable intensity). In some embodiments, the light source 1026 may include elements that switch at very high rates, including rates beyond the parallax-switching rate for the system 1001. For example, the light source 1026 may have light outputting elements that switch the light output on and off at a rate higher than the rate at which the parallax (intra-pupil) images are switched in embodiments in which different intra-pupil images are displayed at different times.

With reference again to FIG. 9, in some embodiments, the control system 1024 may include two parts: 1) light field generation and 2) factored light field optimization. As discussed herein, to approximate a wavefront, an appropriate image is displayed on the spatial light modulator 1018 for each activated light-emitting region of the light source 1026. It will be appreciated that these images are created during the light field generation step, where a 3D scene is rendered from multiple, slightly offset viewpoints corresponding to the slight shifts in activated light-emitting regions. For example, to display a 5×5 light field, the 3D scene would be rendered 25 times from 25 different viewpoints that are arranged in a grid pattern. The location of the viewpoint in the grid pattern would correspond to the location of the activated light source region, and the rendered image would correspond to the image formed by the spatial light modulator.

It may be desirable to increase the brightness of images formed by the spatial light modulator 1018. Advantageously, utilizing a light source 1026 comprising an array of light emitters allows the formation of light-emitting regions having a variety of shapes and sizes, which may be utilized to increase brightness. In some embodiments, brightness may be increased by increasing the size of the activated light-emitting region without significantly changing the image formed by the spatial light modulator 1018. The computation module 1024a may be configured to determine the size and shape of the activated light-emitting region using factored light field optimization. The module 1024a may be configured to take an input focal stack and create a series of patterns to be displayed on the spatial light modulator 1018 as well as on the light source 1026, with the patterns configured create a desired approximation to the focal stack in the least squared sense. The optimization takes advantage of the fact that small shifts in the viewpoint do not significantly change the perceived image, and is able to generate light-emitting region patterns utilizing illumination from a larger area on the light source 1026, while displaying the same image on the spatial light modulator 1018.

The optimization problem may be formulated as a non-convex optimization problem, given below:

$$\arg\min_{\{A,B\}} \quad \frac{1}{2}\|y - \mathrm{P}\{AB^T\}\|_2^2$$

$$\text{subject to} \quad 0 \le A, B \le 1,$$

where the projection operator p performs the linear transformation from the 4D light field to the 3D focal stack (using the shift and add algorithm). This problem is a nonnegative matrix factorization embedded in a deconvolution problem. The algorithm solving this problem uses the alternating direction method of multipliers (ADMM). Additional details regarding an example method of solving this problem are discussed in Appendix I. It will be appreciated that the module 1024a is configured to actively calculate, in real time, the appropriate size and shape of the light-emitting region based upon the parallax view to be formed by a spatial light modulator 1018.

In some other embodiments, the optimization problem may be formulated as a slightly different non-convex optimization problem, as given below:

$$\arg\min_{\{A,B\}} \quad \frac{1}{2}\|y - \{AB^T\}\|_2^2$$

$$\text{subject to} \quad 0 \le A, B \le 1,$$

where A and B represent the patterns displayed on the spatial light modulators (e.g., the light source 1026 and the spatial light modulator 1018 for forming images), y is the target 4D light field that is the desired output of the algorithm, and AB' is the operator combining the spatial light modulator patterns to simulate the 4D light field emitted by the physical display when A and B are shown on the modulators. This problem is a nonnegative matrix factorization. The algorithm solving this problem uses an iterative optimization technique to refine A and B from a random initial guess.

With continued reference to FIG. 9, it will be appreciated that the flicker fusion threshold of the human visual system places a time constraint on the number of images that may be injected into the eye 210 while still being perceived as being injected simultaneously. For example, the processing bandwidth of the control system 1024 and the ability to switch light-emitting regions of the light source 1026 and light modulators of the spatial light modulator 1018 may limit the number of images that may be injected into the eye 210 within the duration allowed by the flicker fusion threshold. Given this finite number of images, the control system 1024 may be configured to make choices regarding the images that are displayed. For example, within the flicker fusion threshold, the display system may be required to inject a set of parallactically-disparate intra-pupil images into the eye, and in turn each parallax view may require images of various component colors in order to form a full color image. In some embodiments, the formation of full color images using component color images is bifurcated from the elucidation of a desired accommodation response. For example, without being limited by theory, it may be possible to elicit the desired accommodation response with a single color of light. In such a case, the parallactically-disparate intra-pupil images used to elicit the accommodation response would only be in the single color. As a result, it would not be necessary to form parallactically-disparate intra-pupil images using other colors of light, thereby freeing up time within the flicker fusion threshold for other types of images to be displayed. For example, to better approximate the wavefront, a larger set of parallactically-disparate intra-pupil images may be generated.

In some other embodiments, the control system 1024 may be configured to devote less time within the flicker fusion threshold for displaying images of colors of light for which the human visual system is less sensitive. For example, the human visual system is less sensitive to blue light then green light. As a result, the display system may be configured to generate a higher number of images formed with green light than images formed with blue light.

Figure 11A:
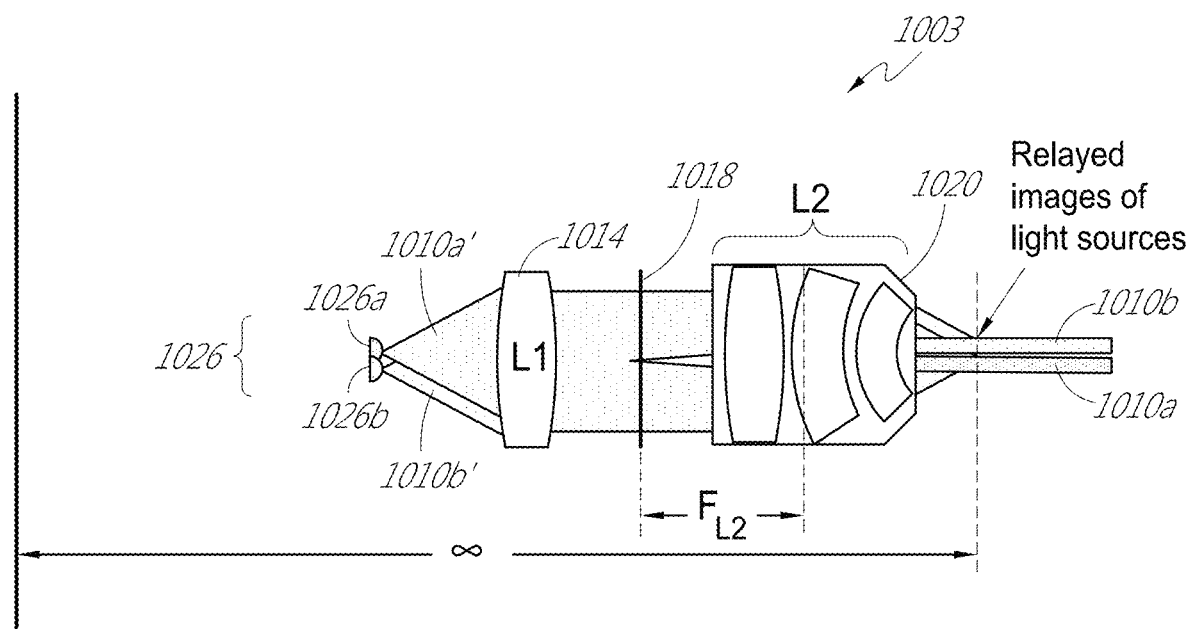
FIG. 11A illustrates another example of a projection system for forming the divergent wavefront approximation of FIG. 7B.

With reference now to FIG. 11A, another example of a projection system 1003 for forming the divergent wavefront approximation of FIG. 7B is illustrated. Preferably, the projection system produces a relatively long depth of field, which may be controlled by the limiting aperture in the system. Without being limited by theory, projection systems providing images to the eye with an effective pupil diameter of approximately 0.5 mm are believed to force the human visual system to operate in "open-loop" mode, as the eye is unable to accommodate to such images. By providing images with such an effective pupil diameter, the display system reduces the spot-size on the retina for an infinity-focused image.

With continued reference to FIG. 11A, the projection system 1003 forms images with parallax disparity as discussed herein. The images may be rapidly, alternatingly provided to the eye of a viewer at a rate that is higher than the perception persistence of the human visual system (e.g. >60 Hz). As discussed herein, the illustrated projection system 1003 simultaneously produces an image of the illumination source at a finite conjugate plane, and an image of the pixel (image) source at infinity. In addition, selectively activated light-emitting regions 1026a and 1026b are spaced to produce displacement of the optical system pupil to align the parallax images with respect to each other within the viewer pupil.

Figure 11B:
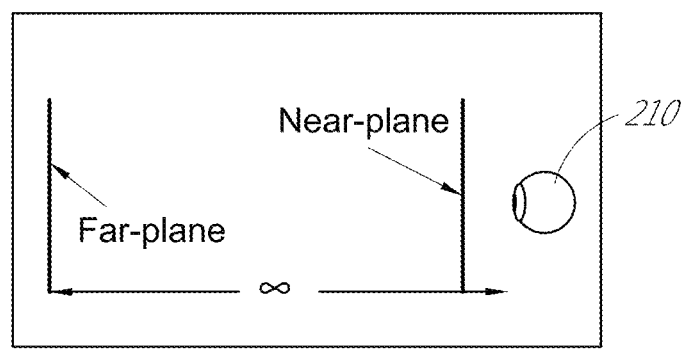
FIG. 11B illustrates an example of a range of depth planes provided by the projection system of FIG. 11A.

With reference now to FIG. 11B, an example of a range of depth planes provided by the projection system of FIG. 11A is illustrated. The range spans from a far plane at optical infinity to a near plane closer to the eye 210. The far plane at optical infinity may be provided by collimated light beams 1010a and 1010b. The near plane may be provided using spatially displaced activated light-emitting regions, as disclosed herein, and may be understood to be the nearest depth plane provided by the display system. In some embodiments, the perceived nearness of the near plane to the eye 210 may be determined by the maximum parallax disparity between the light beams 1010a and 1010b, which may be determined by the maximum distance that the display system allows the selectively activated light-emitting regions 1026a and 1026b to be separated while still forming a clear image of the light source 1026 at or near the viewer's pupil.

Advantageously, as discussed herein, the use of a light source 1026 comprising a plurality of discrete, selectively activated light emitters provides the ability to produce a broad range of pupil or perceived image shapes, luminance profiles, and arrays to achieve various depth of field effects (through manipulation of illumination source size, shape and position). The light source 1026 advantageously also provides the ability to flexibly and interactively change the shape of the pupil to accommodate horizontal parallax only, full parallax, or other combinations of parallax as is desired for driving accommodation while providing high luminous efficiency.

Figure 12:
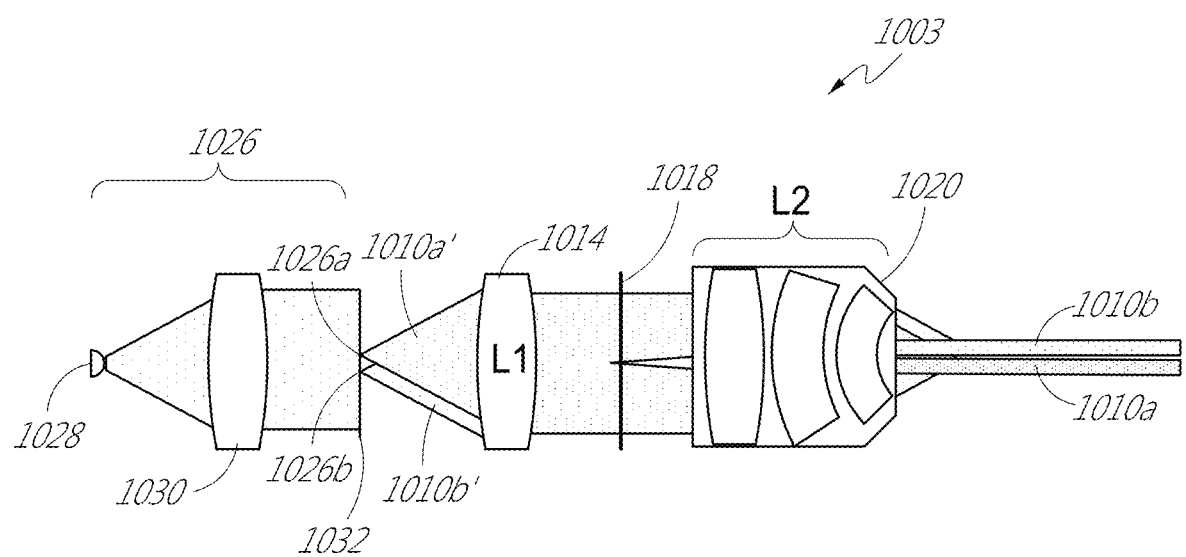
FIG. 12 illustrates an example of a light source configuration for projection systems.

With reference now to FIG. 12, an example of a light source configuration for projection systems 1003 is illustrated. The light source 1026 includes a single fixed illuminator 1028 and a spatial light modulator 1032 for regulating the output of light from the illuminator 1028 to the spatial light modulator 1018 for forming images. The light source 1026 may also include a condenser/collimator lens to direct light from the illuminator 1028 to the spatial light modulator 1032. The spatial light modulator 1032 may include pixels and/or shutters that allow or block light from passing through as desired. It will be appreciated that the pixels and/or shutters may be actuated to permit light to pass and that the areas in which light passes are considered to be light-emitting regions (e.g. light-emitting regions 1026a and 1026b).

Figure 13A:
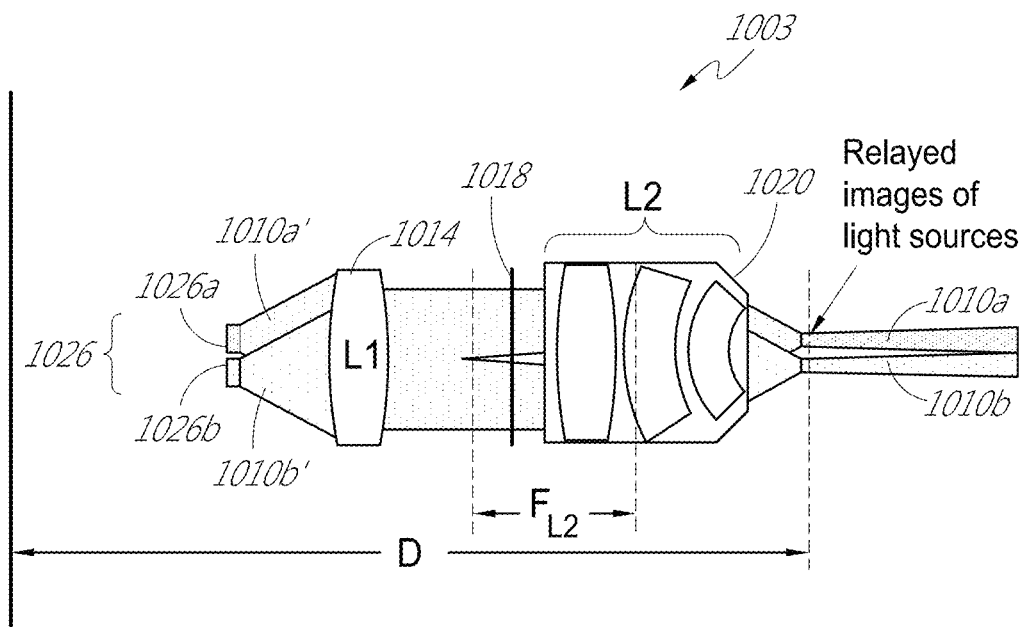
FIG. 13A illustrates an example of a projection system for placing virtual objects on a default depth plane that is less than optical infinity.

With reference now to FIG. 13A, an example of a projection system 1003 for placing virtual objects on a default depth plane that is less than optical infinity is illustrated. As illustrated, the projection optics 1020 may have a focal length "F" and the spatial light modulator may be positioned at less than F, which biases the system 1003 to have a far depth plane at less than optical infinity by causing the light beams 1010a and 1010b to diverge. The amount that the light beams 1010a and 1010b diverge may be determined by the position of the spatial light modulator 1018 relative to the projection optics 1020, with closer spacing causing greater amounts of divergence. Because a certain amount of divergence is expected as a default due to the spacing, in some embodiments, the size of the light-emitting regions 1026a and 1026b for each intra-pupil image may be scaled up (e.g. by increasing the number of LEDs, increasing the number of light source illumination pixels, etc. that are activated to illuminate the spatial light modulator when forming an intra-pupil image) and the exit pupil associated with each intra-pupil image may be larger than 0.5 mm. As a result, the visual system may not function in an open loop mode. In some embodiments, the size of the light-emitting regions 1026a and 1026b may be set by the control system 1024 (FIG. 9), which may be programmed to vary the size of the light-emitting regions 1026a and 1026b based upon a desired default depth plane for the system 1003. In addition, the cross-sectional widths of the light beams for forming each intra-pupil image is preferably sufficiently large relative to the optical structures of the projection optics 1020 for the projection optics 1020 to act on the light so as to provide the desired divergence.

Figure 13B:
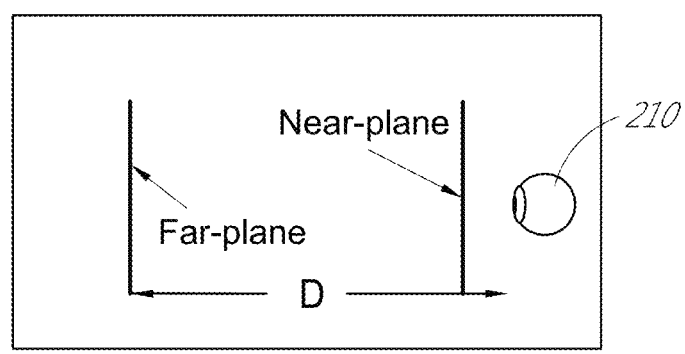
FIG. 13B illustrates an example of a range of depth planes provided by the projection system of FIG. 13A.

With reference now to FIG. 13B, an example of a range of depth planes provided by the projection system of FIG. 13A is illustrated. The illustrated range spans from a far plane, at a distance of D that is less than optical infinity, to a near plane relative to the eye 210. The far plane may be set by appropriate selection of the position of the spatial light modulator relative to the projection optics 1020. The near plane may be provided as disclosed above regarding FIG. 11B.

Figure 14:
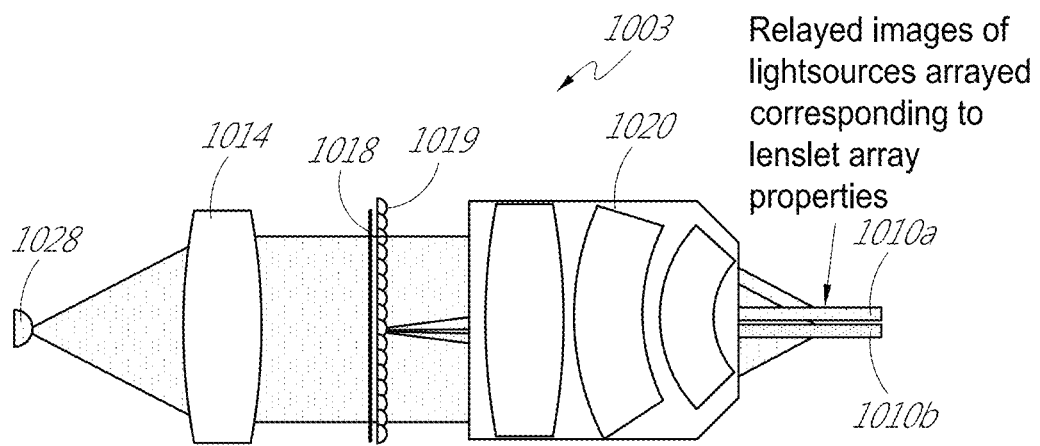
FIG. 14 illustrates an example of a projection system configured for the spatially multiplexed display of intra-pupil images.

With reference now to FIG. 14, an example of a projection system 1003 configured for the spatially multiplexed display of intra-pupil images is illustrated. Rather than relying on spatial displacement between light emitting regions to provide the desired parallax disparity, parallax disparity may be provided by utilizing different areas of the spatial light modulator 1018 to form different intra-pupil images. An optical mechanism 1019 is configured to direct the light from each of these different areas at different angles towards the projection optics 1020, which outputs light beams 1010a and 1010b towards an eye of the viewer (not shown). In some embodiments, the areas of the spatial light modulator 1018 for forming different intra-pupil images may be interleaved. For example, pixels providing image information for different intra-pupil images may be interleaved with one another. The optical mechanism 1019 may be configured to translate the different locations (e.g., different pixels) from which the optical mechanism 1019 receives light into the different angles at which the light from the pixels enter the projection optics 1020. In some embodiments, the optical mechanism 1019 may include a prism and/or a lens structure such as a lenslet array.

It will be appreciated different, non-overlapping regions of the spatial light modulator 1018 may be dedicated to providing image information for different intra-pupil images. Because these regions are distinct from one another, they may be actuated simultaneously in some embodiments. As a result, multiple intra-pupil images may be presented to the eye simultaneously. This may advantageously reduce the requirements for the speed at which the spatial light modulator 1018 is required to refresh images. As discussed above, in order to provide the perception that all images of a set of intra-pupil images for approximating a continuous wavefront are present simultaneously, all of these images must be presented within the flicker fusion threshold. In some embodiments, all or a plurality of images of a set of intra-pupil images are presented at the same time, in different regions of the spatial light modulator, such that rapid sequential displaying of these simultaneously presented images is not required for the human visual system to perceive the images as being present simultaneously.

As illustrated, light source 1028 provides light through lens structure 1014 to illuminate the spatial light modulator 1018. In some embodiments, the light source 1028 may be a single fixed illuminator without any selectively activated light-emitting regions.

Figure 15:
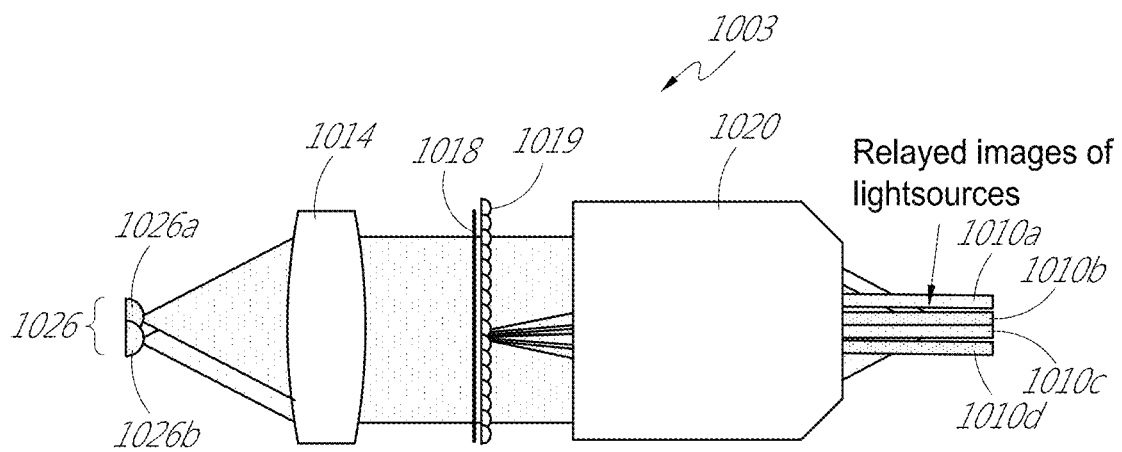
FIG. 15 illustrates an example of a projection system configured for spatially and temporally multiplexed display of intra-pupil images.

In some other embodiments, the light source may include selectively activated light-emitting regions, which may advantageously provide additional control over parallax disparity. Thus, the projection system may utilize both spatial and temporal multiplexing. With reference now to FIG. 15, an example of a projection system 1003 configured for spatial and temporal multiplexing of intra-pupil images is illustrated. The projection system 1003 may include the light source 1026, which may include selectively activated light-emitting regions, e.g., regions 1026a and 1026b. As discussed herein, spatial displacement between the light emitting regions may be utilized to provide parallax disparity in the alternately outputted light beams 1010a, 1010b, 1010c, and 1010d. In addition, as discussed above regarding FIG. 14, the projection system 1000 may include the optical mechanism 1019 between the spatial light modulator 1018 and the projection optics 1020. The spatial light modulator 1018 and optical mechanism 1019 may work together to provide spatial multiplexing. Thus, illumination of the spatial light modulator 1018 by a single light-emitting region may produce multiple intra-pupil images. For example, activation of the light-emitting region 1026a illuminates the spatial light modulator 1018, which simultaneously generates image information for two intra-pupil images, with the light beams for each image directed in different directions by the optical mechanism 1019. The light enters the projection optics 1020 and exits as light beams 1010b and 1010d for forming two distinct intra-pupil images. Similarly, subsequent activation of the light-emitting region 1026b results in light beams 1010a and 1010d for forming two other intra-pupil images.

With reference to both FIGS. 14 and 15, in some embodiments, as discussed above regarding FIGS. 11A-11B and 13A-13B, the locations of the spatial light modulator 1018 and optical mechanism 1019 relative to the projection optics 1020 may be selected to provide a desired default "home" depth plane, which may be less than optical infinity.

The projection system 1003 shown in the various figures herein may be part of a hybrid system utilizing a single finite focal-length eyepiece, which places objects on a non-infinity depth plane as a default, while employing parallax-driven accommodation to place virtual objects on other depth planes. For example, the projection system 1003 may be configured to have a default depth plane at 0.3 dpt or 0.5 dpt, which may be sufficiently close the optical infinity to fall within a tolerance of the human visual system for accommodation-vergence mismatches. For example, without being limited by theory, it is believed that the human visual system may comfortably tolerate displaying content from optical infinity on a depth plane of 0.3 dpt. In such systems, beams of light 1010a and 1010b will have an amount of wavefront divergence corresponding to the default depth plane. Advantageously, such configurations may reduce the computational a load on processors (e.g., graphics processing units) in the display system, which may provide advantages for lowering power consumption, lowering latency, increasing processor options, among other benefits With reference now to FIG. 16, an example is illustrated of a projection system 1003 comprising a pupil relay combiner eyepiece 1030 for superimposing image content on a user's view of the world. Preferably, the eyepiece 1030 is optically transmissive, allowing light from the world to propagate through the eyepiece into the eye 210 of the viewer. In some embodiments, the eyepiece 1030 comprises one or more waveguides having incoupling optical elements 770 and outcoupling optical elements 800. The incoupling optical element 770 receive light from the projection optics 1020 and redirect that light such that it propagates through the eyepiece 1030 by total internal reflection to the out coupling optical element 800. The outcoupling optical element 800 outputs the light to the viewer's eye 210. Advantageously, eyepiece 1030 preserves all of the image attributes of provided by the projection system 1003, and thus rapidly switching parallax views are accurately portrayed through the eyepiece 1030.

The incoupling optical element 770 and the outcoupling optical element 800 may be refractive or reflective structures. Preferably, the incoupling optical element 770 and the outcoupling optical element 800 are diffractive optical elements. Examples of diffractive optical elements include surface relief features, volume-phase features, meta-materials, or liquid-crystal polarization gratings.

It will be appreciated that the outcoupling optical elements 800 or other optical elements forming part of the eyepiece 1030 may be configured to have optical power. In some embodiments, the optical power may be chosen to correct for refractive errors of the eye 210, including refractive errors such as myopia, hyperopia, presbyopia, and astigmatism.

Figure 17:
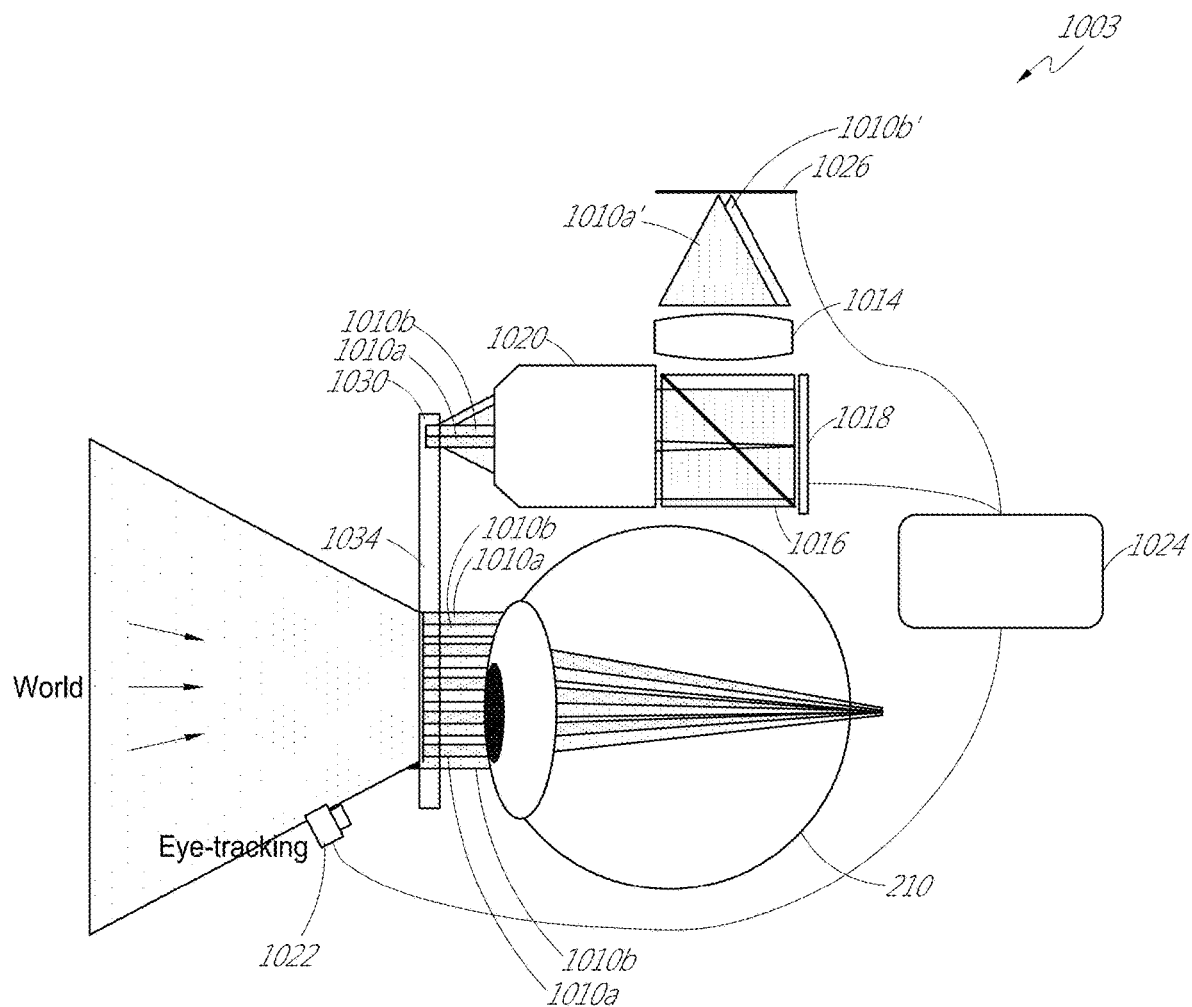
FIG. 17 illustrates an example of a display system comprising an eye tracking system and a combiner eyepiece with a pupil expander.

With reference now to FIG. 17, an example is illustrated of a projection system 1003 comprising the eye tracking system 1022 and a combiner eyepiece 1030 with a pupil expander 1034. The pupil expander replicates the projection system pupil across the eyepiece 1030. Since the pupil expander 1034 replicates the projection system pupil across a large area that may be traversed by the viewer's pupil through eye motion, the images formed by the spatial light modulator 1018 and locations of the light-emitting regions of the light source 1026 can be updated based on input from the eye tracking system 1022 in real time. Advantageously, this configuration enables a larger eyebox for more comfortable viewing, relaxing restrictions on eye-to-combiner relative positioning and variations in inter-pupillary distance.

Figure 18:
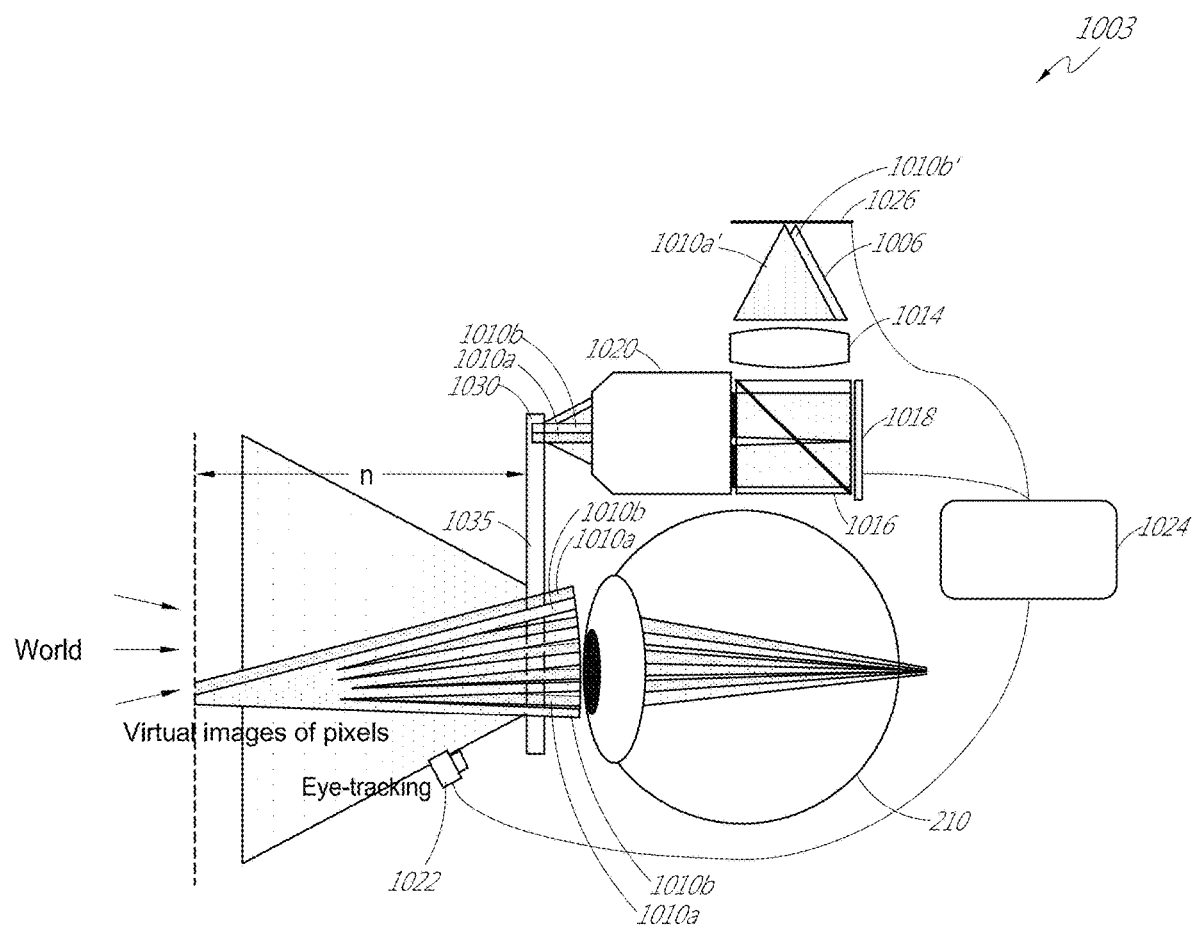
FIG. 18 illustrates an example of a display system comprising an eye tracking system and a pupil rely combiner eyepiece with a pupil expander configured to produce a non-infinity depth plane.

With reference now to FIG. 18, an example is illustrated of a projection system 1003 comprising eye tracking system 1022 and a combiner eyepiece 1030 with a pupil expander 1035 configured to produce a non-infinity depth plane. In some embodiments, the non-infinity depth plane may be at 3 meters, which offers an in-budget accommodation of ~2.5 meters to infinity. For example, given the tolerance of the human visual system for accommodation-vergence mismatches, virtual content at distances of ~2.5 meters to infinity from the viewer may be placed on the 3 meter depth plane with little discomfort. In such a system, the parallactically-disparate intra-pupil images may be used to drive accommodation for a narrower range of depth planes, possibly all closer to the viewer than the fixed "default" focal plane. In some embodiments, this system may also incorporate the eye tracking system 1022 to determine the distance of the viewer's fixation based, e.g., on vergence angles of both eyes of the viewer.

In some embodiments, the light source 1026 may be replaced with a virtual light source formed on the image plane of a light projection system. The light projection system may include an actuator capable of causing a beam of light to scan across an area on the image plane corresponding to the virtual light source. To mimic the ability to activate the discrete light-emitting areas of the light source 1026, the output of light by the projection system is synchronized with the movement of the actuator to cause light to be outputted to desired locations on the image plane at particular times. Preferably, the rate at which the actuator is able to scan the beam of light across the image plane is sufficiently high that all desired light output locations on image plane may be accessed during the timeframe in which any given intra-pupil image is displayed. For example, during the amount of time that a particular intra-pupil image is displayed, the actuator is preferable be able to scan a beam of light at least once, and preferably a plurality of times, across the area of the image plane corresponding to the virtual 2D light source.

Figure 19:
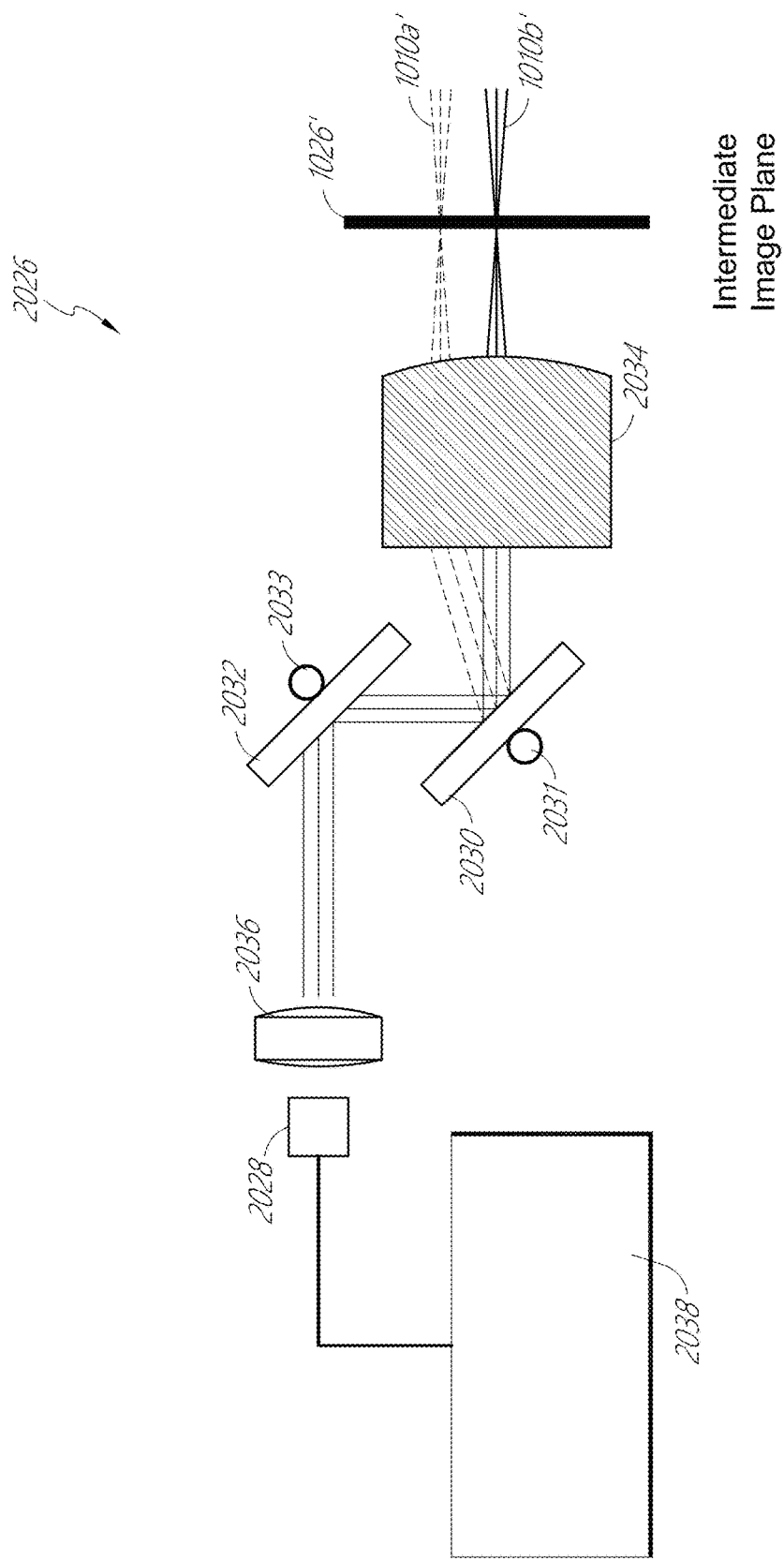
FIG. 19 illustrates a light source comprising mirrors for directing the propagation of light to different light output locations.

FIG. 19 illustrates a light source 2026 comprising mirrors for directing the propagation of light to different light output locations. The light source 2026 comprises a light emitter 2028 and mirrors 2030 and 2032, which are moved by actuators 2031 and 2033, respectively. Examples of light emitters 2028 include LED's and lasers. In some embodiments, a fiber optic cable may transmit light from a remotely situated light emitter. As illustrated, light 1010a', 1010b' propagates from the light emitter 2028 to the mirror 2032 which reflects the light to the mirror 2030 which then reflects the light to propagate through the lens 2034 to focus on the intermediate image plane 1026'. The mirrors 2030 and 2032 may be part of a dual-axis galvanometer, with the actuators 2031 and 2033 rotating the mirrors along different axes, e.g., orthogonal axes, thereby allowing light to be directed to an area defined along the two axes of the image plane 1026'. In some embodiments, the actuators 2031, 2033 may be motors. The lens 2034 may be a linear transfer lens such as a F-theta (F-θ or F-tan θ) lens and may be configured to focus light onto the flat image plane 1026'. In some embodiments, light rays 1010a', 1010b' propagate away from the image plane 1026' in a similar manner as light would propagate from the light source 1026 (see, e.g., FIG. 9). In some embodiments, the light source 2026 may also include a collimating lens 2036 to collimate light emitted by the light emitter 2028 before the light reaches the mirror 2032.

The light source 2026 preferably also includes or is in communication with a processing module 2038 that controls and synchronizes the output of light from the light emitter 2028 with the movements of the actuators 2031, 2033 and the intra-pupil image to be formed. For example, the processing module 2038 may coordinate the movements of the mirrors 2032, 2030 with the emission of light from the light emitter 2028. In some embodiments, the mirrors 2032, 2030 are continuously rotated or swiveled back and forth by the actuators 2031, 2033 on the axis on which the mirror is designed to move. The emission of light (e.g., a pulse of light) by the light emitter 2028 is timed with this movement such that the light is directed to a desired location on the intermediate image plane 1026' at a given moment in time, and this location and time are also determined based on the intra-pupil image to be displayed (e.g., the activation of a particular light output location coincides in time with the display of an intra-pupil image having parallax disparity associated with that particular light output location). In some embodiments, the emission of light from the light emitter 2028 is controlled by switching the light emitter 2028 between on and off states (e.g., by supplying or not supplying power, respectively, to the light emitter). In some other embodiments, the emission of light from a light emitter 2028 may be controlled mechanically, using a physical switch that selectively allows or blocks light from reaching the image plane 1026'.

Figure 20:
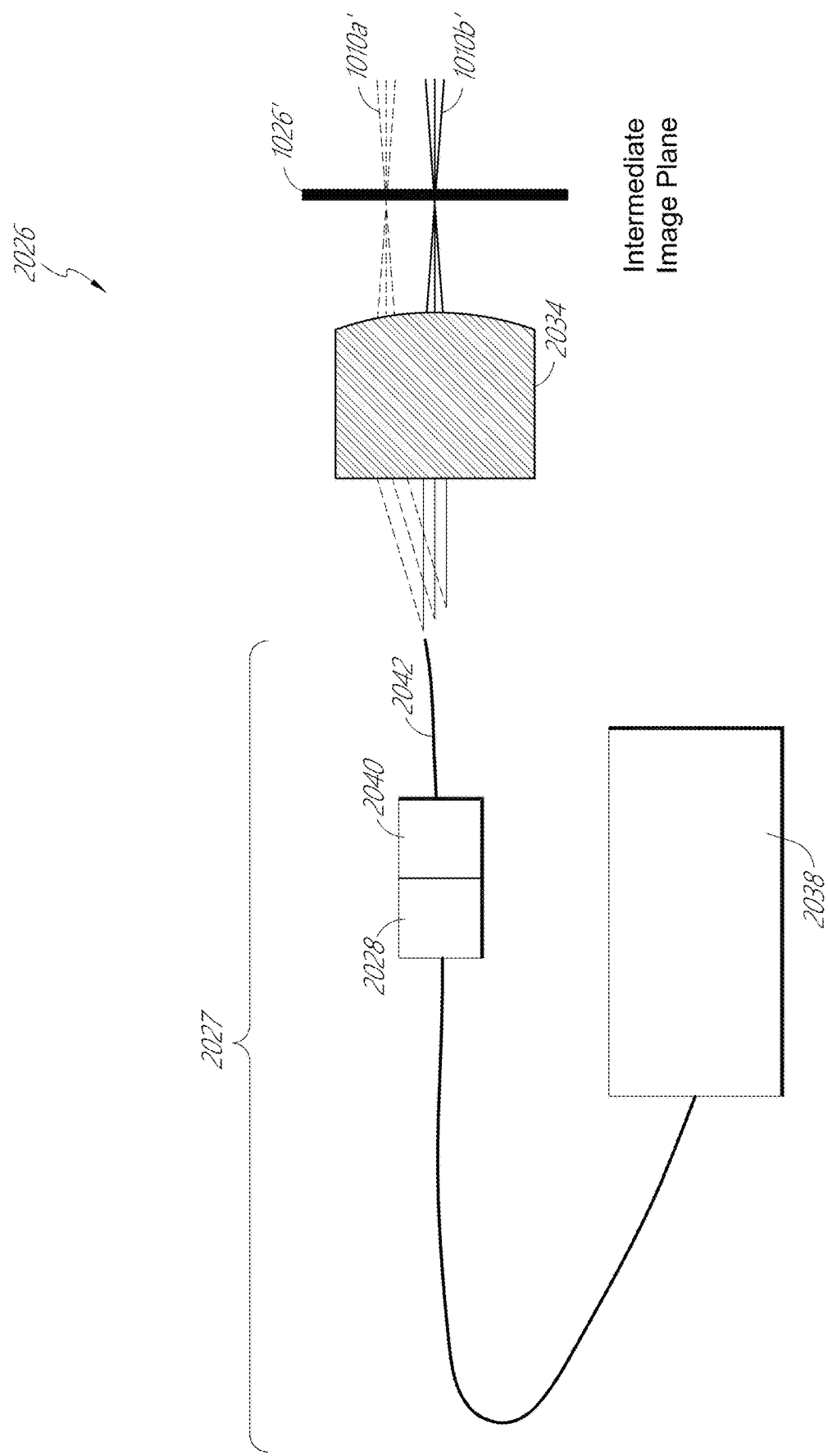
FIG. 20 illustrates a light source comprising a fiber scanner.

With reference now to FIG. 20, light source 2026 may include a fiber scanner 2027. The fiber scanner 2027 may include light emitter 2028 and an actuator 2040 which causes the fiber 2042 to move. Light 1010a', 1010b' propagates out of the end of the fiber 2042 through the lens 2034 and focuses on the image plane 2026'. It will be appreciated that the actuator 2040 may cause the fiber 2042 to move along a predefined path (e.g., a circular path) at a known speed. Consequently, the processing module 2038 may be configured to synchronize the propagation of light out of the end of the fiber 2042 with the movement of the fiber 2042 such that light propagates out of the fiber 2042 at a desired light output location, which is in turn synchronized with the intra-pupil image to be displayed.

As noted above, the light source 2026 may replace the light source 1026 in any of the display systems discussed. For example, the light source 2026 may substitute for the light source 1026 in the projection system 1003 or display system 1001 of any of FIGS. 9, 11A, 12, 13A, and 15-18.

Figure 21:
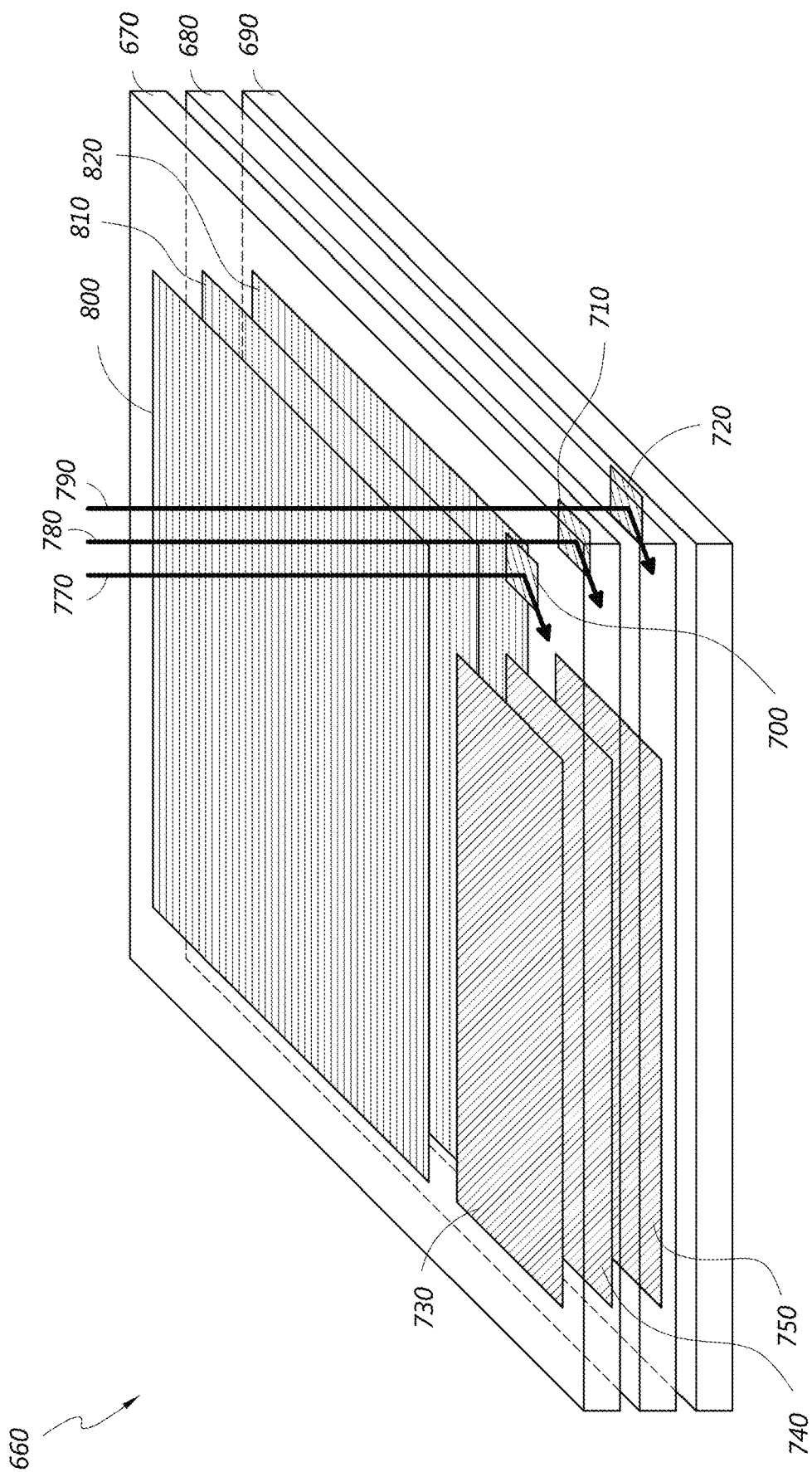
FIG. 21 illustrates an example of an eyepiece comprising a stacked waveguide assembly for outputting light of different wavelengths corresponding to different component colors.

With reference now to FIG. 21, an example is illustrated of an eyepiece 660 (which may correspond to the eyepiece 1030, FIGS. 14-16) comprising a stacked waveguide assembly for outputting light of different wavelengths corresponding to different component colors. In some embodiments, the waveguide assembly includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element.

For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720. In some embodiments, the in-coupling optical elements 700, 710, 720 are vertically aligned and are not laterally offset.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

With continued reference to FIG. 21, light rays 770, 780, 790 are incident on and injected into the waveguides 670, 680, 690 by projection system 1003 (FIGS. 9 and 11-16).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR.

For example, in-coupling optical element 700 may be configured to deflect ray 770, which has a first wavelength or range of wavelengths. Similarly, the transmitted ray 780 impinges on and is deflected by the in-coupling optical element 710, which is configured to deflect light of a second wavelength or range of wavelengths. Likewise, the ray 790 is deflected by the in-coupling optical element 720, which is configured to selectively deflect light of third wavelength or range of wavelengths.

With continued reference to FIG. 21, the in-coupled light rays 770, 780, 790 are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

Figure 16:
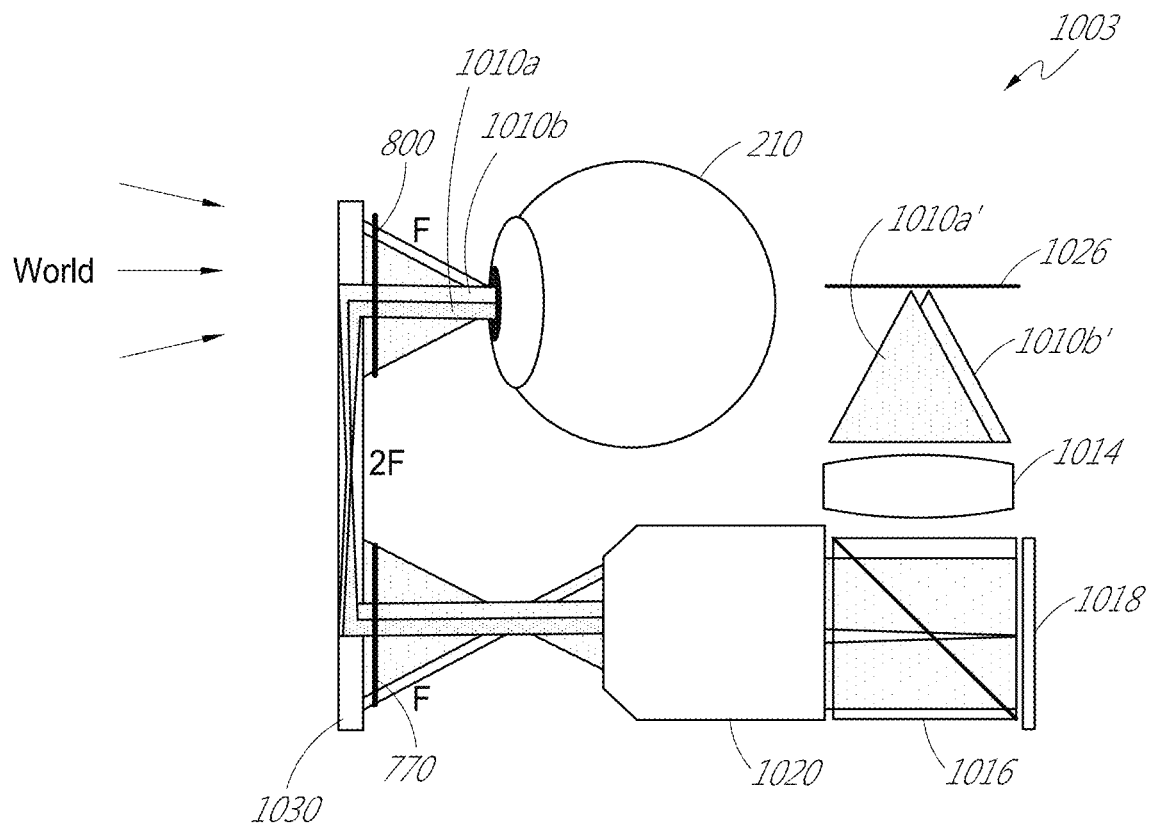
FIG. 16 illustrates an example of a projection system comprising a pupil relay combiner eyepiece for superimposing image content on a user's view of the world.

In some embodiments, the light distributing elements 730, 740, 750 are orthogonal pupil expanders (OPE's). In some embodiments, the OPE's both deflect or distribute light to the out-coupling optical elements 800, 810, 820 and also increase the beam or spot size of this light as it propagates to the out-coupling optical elements. In some embodiments, e.g., where the beam size is already of a desired size, the light distributing elements 730, 740, 750 may be omitted and the in-coupling optical elements 700, 710, 720 may be configured to deflect light directly to the out-coupling optical elements 800, 810, 820. In some embodiments, the out-coupling optical elements 800, 810, 820 are exit pupils (EP's) or exit pupil expanders (EPE's) that direct light in a viewer's eye 210 (FIGS. 15-16). It will be appreciated that the OPE's may be configured to increase the dimensions of the eye box in at least one axis and the EPE's may be to increase the eye box in an axis crossing, e.g., orthogonal to, the axis of the OPEs.

Accordingly, in some embodiments, the eyepiece 660 includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 22:
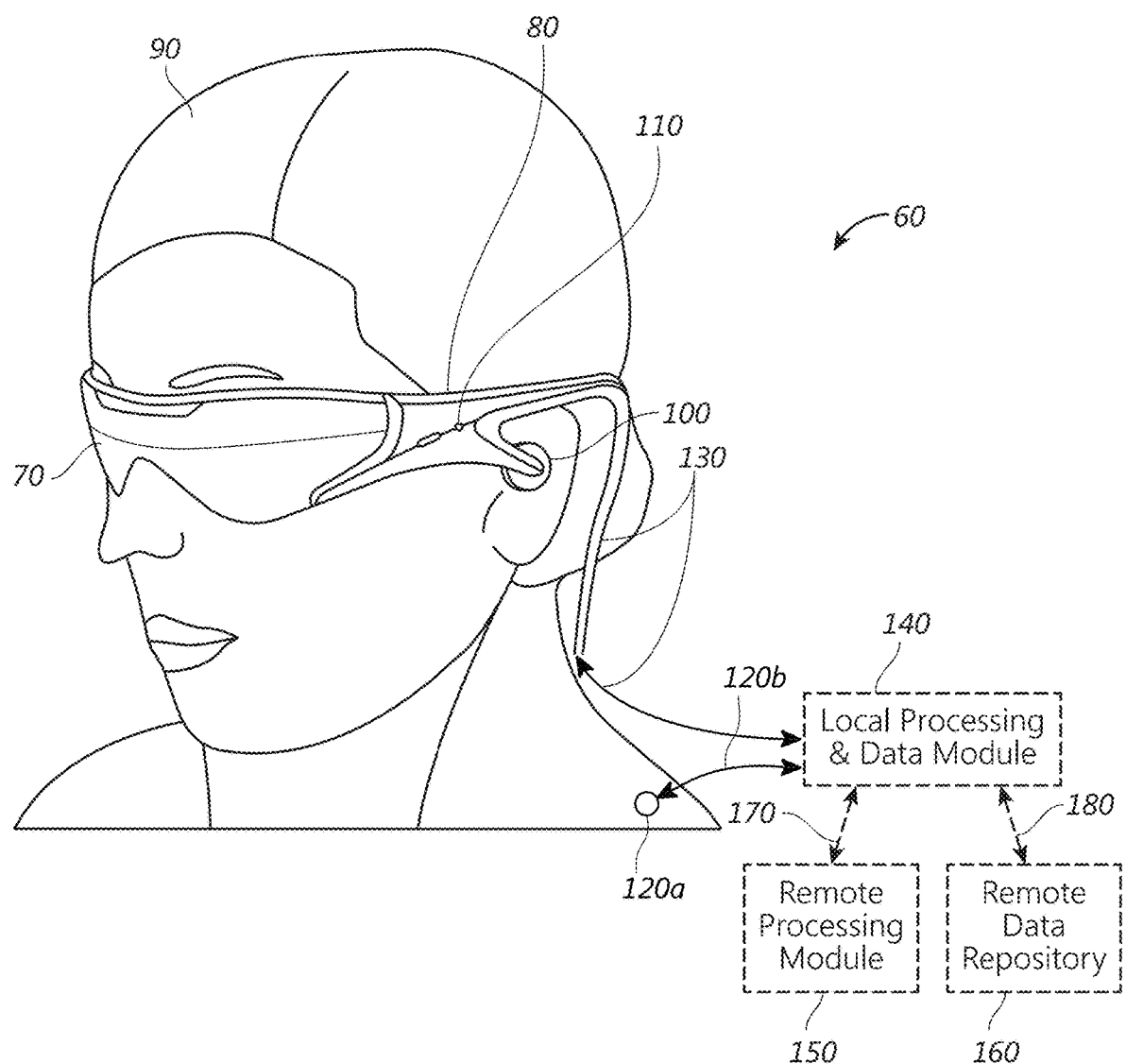
FIG. 22 illustrates an example of a wearable display system.

With reference now to FIG. 22, an example is illustrated of a wearable display system 60. The display system 60 may correspond to the display system 1001 of FIG. 9, with a projection system 1003 for each eye of the viewer or user 90.

The display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, is positioned adjacent the other ear canal of the user to provide stereo/shapeable sound control). In some embodiments, the display system may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing the physiological state of the user 90 in some embodiments. For example, the sensor 120a may be an electrode.

With continued reference to FIG. 22, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways. In some embodiments, the local processing and data module 140 may include one or more graphics processors, and may correspond to the control system 1024 (FIG. 9).

With continued reference to FIG. 22, in some embodiments, the remote processing module 150 may comprise one or more processors configured to analyze and process data and/or image information. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module.

EXAMPLES—LIGHT FIELD AND FOCAL STACK FACTORIZATION

Light field and focal stack factorization may be utilized to determine the light output of the display system 1001, including the outputs of the light source 1026, 2026 and the spatial light modulator 1018. Details regarding the factorization are discussed below.

1. Focal Stack Factorization

A focal stack y is factored into a series of time-multiplexed patterns to be displayed on two spatial light modulators A and B, which are located in the pupil and image plane, respectively. In some embodiments, spatial light modulators A and B may correspond to the light source 1026, 2026 and the spatial light modulator 1018, respectively. All quantities are vectorized, such that the focal stack $y \in \mathbb{R}_+^{m \times n \times s}$, which has a vertical resolution of m pixels, a horizontal resolution of n pixels, and s focal slices, will be represented as a single vector $y \in \mathbb{R}_+^{mns}$. Bold-face symbols are used below for discrete vectors. Unless otherwise specified, different color channels are ignored and assumed to be independent. Table 1 provides an overview of tensor notification and operators employed herein.

TABLE 1

Overview of tensor notation and operators.

| Notation | Interpretation |
|---|---|
| α | scalar |
| a | vector |
| A | matrix |
| a∘b | vector outer product |
| A⊙B | Hadamard matrix product (elementwise product) |
| A⊘B | Hadamard matrix division (elementwise division) |

The spatial light modulator in the image plane B also has a resolution of m×n pixels, but in addition k time-multiplexed patterns may be shown in quick succession such that they will be perceptually averaged by the viewer. These spatio-temporal patterns are represented as the matrix $B \in \mathbb{R}_+^{mn \times k}$ such that all spatial pixels are vectorized and form the row indices of this matrix and the k time steps are the column indices of the matrix. Similarly, the pupil-plane SLM A will be represented as the matrix $A \in \mathbb{R}_+^{o \times k}$ where o is the total number of addressable SLM pixels in the pupil plane and the column indices again are the time steps.

Accordingly, the goal of factoring a focal stack y into a set of time-multiplexed patterns may be written as the nonconvex optimization problem $$\operatorname*{argmin}_{\{A,B\}} \frac{1}{2}\|y - \mathcal{P}\{AB^T\}\|_2^2 \qquad (1)$$
$$\text{subject to} \quad 0 \le A, B \le 1,$$

where the projection operator $\mathcal{P}: \mathbb{R}^{o \times mn} \to \mathbb{R}^{mns}$ performs the linear transformation from the 4D light field to the 3D focal stack (using the shift+add algorithm). This problem is a nonnegative matrix factorization embedded in a deconvolution problem. The alternating direction methods of multipliers (ADMM) (as described by Boyd et al, 2001, "Distributed optimization and statistical learning via the alternating direction method of multipliers", *Foundations and Trends in Machine Learning* 3, 1, 1-122) may be used to solve it.

To bring Equation 1 into the standard ADMM form, it may be rewritten as the equivalent problem $$\operatorname*{argmin}_{\{A,B\}} \underbrace{\frac{1}{2}\|y - Pz\|_2^2}_{g(z)} \qquad (2)$$
$$\text{subject to}$$
$$z - vec\{AB^T\} = 0$$
$$0 \le A, B \le 1,$$

where the matrix $P \in \mathbb{R}^{mns \times mno}$ is the matrix form of operator $\mathcal{P}$ and the operator vec simply vectorizes a matrix into a single 1D vector (e.g. using column-major order as conducted by the software MATLAB available from MathWorks of Natick, Mass.).

Then, the Augmented Lagrangian of this system is formulated as $$\mathcal{L}_\rho(A, B, z, \xi) = g(z) + \xi^T (vec\{AB^T\} - z) + \frac{\rho}{2}\|\{AB^T\} - z\|_2^2. \qquad (3)$$

In the scaled form, this Augmented Lagrangian is written as $$\mathcal{L}_\rho(A, B, z, u) = \underbrace{\frac{1}{2}\|y - Pz\|_2^2}_{g(z)} + \frac{\rho}{2}\|vec\{AB^T\} - z + u\|_2^2, \qquad (4)$$

where $u = (1/\rho)\xi$.

The ADMM algorithm then consists of three separate updates (or proximal operators) that are iteratively executed as $$z \leftarrow \operatorname*{argmin}_{\{z\}} \frac{1}{2}\|y - Pz\|_2^2 + \frac{\rho}{2}\|z - v\|_2^2, \quad v = AB^T + u \qquad (5)$$

$$B\} \leftarrow \operatorname*{argmin}_{\{A,B\}} \|V - AB^T\|_F^2, \quad V = ivec\{u - z\} \qquad (6)$$

$$u \leftarrow u + AB^T - z \qquad (7)$$

Here, the operator ivec{·} reshapes a vector into a matrix and undoes what the operator vec does to vectorize a matrix. Equations 5-7 may be solved iteratively, each time using the latest output from the previous step.

1.1 Efficient z-Update

Equation 5 is an unconstrained linear problem that may be re-written as a single linear equation system:

$$\begin{bmatrix} P \\ \rho I \end{bmatrix} z = \begin{bmatrix} y \\ \rho v \end{bmatrix} \qquad (8)$$

This system is large-scale, but all operations may be expressed as matrix-free function handles so the matrices are never explicitly formed. A variety of different solvers that may be used to solve this system for z. For example, the very simple simultaneous algebraic reconstruction technique (SART) of MATLAB may be utilized.

To increase computational efficiency, it would be desirable to derive a closed-form solution for the z-update. This may facilitate a real-time implementation of the entire algorithm. One approach to deriving a closed form solution starts with the normal equations for Equation 8:

$$\hat{z} = (P^T P + \rho^2 I)^{-1}(P^T y + \rho^2 v) \quad (9)$$

To find a closed form solution for this, the matrix inverse of $(P^T P + \rho^2 I)$ is derived. Since P converts a light field into a focus stack and the Fourier Slice Theorem dictates that refocus in the primal domain is a slicing in the Fourier domain, the closed form solution in the frequency domain may be derived. Using this insight, one may write $$P^T P = F_{4D}^{-1}\left(\sum_{i=1}^{s} O_i^* O_i\right) F_{4D}. \quad (10)$$

Here, s is the number of slices in the focal stack, $O_i$ is a diagonal matrix representing the slicing operator for focal slice $i$ in the 4D frequency domain. $F_{4D}$ and $F_{4D}^{-1}$ represent the discrete 4D Fourier transform and its inverse, respectively.

An expected algebraic expression for the matrix inverse is $$(P^T P + \rho I)^{-1} = F_{4D}^{-1} \frac{1}{\sum_{i=1}^{s} O_i^* O_i + \rho^2 I} F_{4D} \quad (11)$$

It will be appreciated that such a closed form solution may provide a solution more quickly than an iterative algorithm, since no iterations are required. Nevertheless, if sufficient computational resources are available, then an iterative algorithm is also suitable.

1.2 Efficient A,B-Update

The A, B-update (Eq. 6) is a nonnegative matrix factorization (NMF) problem. In this case, it is the easiest possible NMF problem. Standard solutions for this and more advanced NMF approaches are detailed in Sub-section 2 below.

1.3 Dealing with Color Channels

In the above derivations, a grayscale factorization was assumed or it was assumed that each color channel may be treated independently. In some cases, this may not provide a satisfactory approximation; for example, two color SLMs may introduce color crosstalk, which is not modeled above. In addition, in some embodiments, the display system may use a combination of a grayscale LCoS in the image plane and a color LED or OLED array in the pupil plane. In this case, all color channels are linked.

In accounting for linked color channels, neither the z-update nor the u-update change—these may be computed independently per color channel in every ADMM iteration. However, the matrix factorization routine A,B-update does change. Instead of factoring each color channel $A_{R,G,B}/B_R$, $G,B$ independently, a single factorization is performed for all color channels of A simultaneously (B does not contain color channels in this case) as $$\underset{\{A, B\}}{\operatorname{argmin}} \left\| \begin{pmatrix} V_R \\ V_G \\ V_B \end{pmatrix} - \begin{pmatrix} A_R \\ A_G \\ A_B \end{pmatrix} B^T \right\|_F^2 \quad (12)$$

2 Matrix Factorization Variants

Nonnegative matrix factorization is one approach to decompose a matrix into a sum of nonnegative rank-one matrices. The decomposition problem is not convex, therefore solutions are not straightforward. The problem and possible solutions will now be discussed.

The problem may be stated as that of decomposing a matrix X into a sum of rank-one matrices $$X \approx \sum_{k=1}^{K} a_k \circ b_k = AB^T, \quad (13)$$

where $X \in \mathbb{R}^{M \times N}: x_{ij} \geq 0$, $A \in \mathbb{R}^{M \times K}$; $a_{ik} \geq 0$, and $B \in \mathbb{R}^{N \times K} \geq 0$. A sum of rank-one matrices results in a rank-K approximation of the original matrix.

A least squared error solution to the problem may be found by optimizing the following objective function:

$$\underset{\{A,B\}}{\operatorname{argmin}} \quad J(A, B) = \frac{1}{2}\|X - AB^T\|_F^2 = \frac{1}{2}\sum_{ij}(x_{ij} - (AB^T)_{ij})^2 \quad (14)$$

subject to $A, B \geq 0$, where the Forbenius norm of a matrix is given as $\|X\|_F^2 = \Sigma_{ij} x_{ij}^2$.

2.1 Alternating Lease Squares Approach

The cost function $$J(A, B) = \frac{1}{2}\|X - AB^T\|_F^2$$

is both nonlinear and non-convex, with a number of local minima. When fixing either A or B, solving for the other matrix is convex. Without considering the nonnegativity constraints, an alternating least squares approach, expected to converge, may be employed to solve the factorization problem. For this purpose, each factorization matrix is updated while fixing the other in an alternating manner. The individual updates are computed using a gradient descent method:

$$A \leftarrow A - \alpha_A \nabla_A J(A,B)$$

$$B \leftarrow B - \alpha_B \nabla_B J(A,B) \quad (15)$$

where $\nabla_A J(A, B)$ are the derivatives of the cost function with respect to the individual factorization matrices, $\alpha_{A, B}$ their respective step lengths. As shown in the following subsection, one approach to choosing the step length is to pick them such that the update rules become multiplicative. Before discussing the step lengths, the gradients are considered and may be given as:

$$\nabla a_{ik} J(A,B) = \Sigma_{u=1}^{N}(x_{iu} - \Sigma_{l=1}^{K}(a_{il}b_{ul}))(-b_{uk})$$

$$\nabla b_{jk} J(A,B) = \Sigma_{v=1}^{M}(x_{vj} - \Sigma_{l=1}^{K}(a_{vl}b_{jl}))(-a_{vk}) \quad (16)$$

In matrix form, the gradients may be written as:

$$\nabla_A J(A,B) = -(X-AB^T)B$$

$$\nabla_B J(A,B) = -(A^T(X-AB^T))^T. \quad (17)$$

2.2 Multiplicative Update Rules

As noted above, a key to choosing the step length is that by combining them with the steepest descent direction, the additive update rules (Eq. 15) may be written in a purely multiplicative way. Under the conditions that $x_{ij} \geq 0$ and A, B are initialized with positive values, multiplicative update rules provide that the factorization matrices remain positive throughout the iterative update process. The following step lengths result in multiplicative update rules:

$$\alpha_A = A \oslash ((AB^T)B)$$

$$\alpha_B = B \oslash (A^T(AB^T))^T \quad (18)$$

Combining Equations 15, 17, 18 yields $$A \leftarrow A - (A \oslash ((AB^T)B)) \circledast (-(X-AB^T)B) = A \circledast (AB^T)B + A \circledast XB - A \circledast (AB^T)B) \oslash ((AB^T)B)$$

$$B \leftarrow B - (B \oslash (A^T(AB^T))^T) \circledast (-A^T(X-AB^T))^T = (B \oslash (A^T(AB^T))^T) + B \circledast (A^TX)^T - B \oslash (A^T(AB^T))^T) \oslash (A^T(AB^T))^T. \quad (19)$$

The following multiplicative update rules are simplified versions of Equation 19:

$$A \leftarrow A \circledast (XB) \oslash ((AB^T)B),$$

$$B \leftarrow B \circledast (A^TX)^T \oslash (A^T(AB^T))^T. \quad (20)$$

Starting from an initial guess that contains only positive values (usually random noise) and assuming that the data matrix X is nonnegative, these update rules are expected to keep A and B positive throughout the iterative process. In practice, a small value is added to the divisor so as to avoid division by zero.

2.3 Weighted Nonnegative Matrix Factorization $$\operatorname*{argmin}_{\{A,B\}} \frac{1}{2}\|X - AB^T\|_W^2 = \frac{1}{2}\sum_{ij} w_{ij}(x_{ij} - (AB^T)_{ij})^2 \quad (21)$$

subject to $A, B \geq 0$,

The multiplicative update rules may be modified to include weights for each matrix element $x_{ij}$ $$A \leftarrow A \circledast ((W \circledast X)B) \oslash ((W \circledast (AB^T))B),$$

$$B \leftarrow B \circledast (A^T(W \circledast X))^T \oslash (A^T((AB^T) \circledast W))^T, \quad (22)$$

where W is a weight matrix of the same size as X.

2.4 Projected NMF

The projected NMF adds an additional projection matrix P to the objective function that stays fixed throughout the optimization procedure:

$$\operatorname*{argmin}_{\{A,B\}} J(A,B) = \quad (23)$$

$$\frac{1}{2}\|X - PAB^T\|_F^2 = \frac{1}{2}\sum_{ij}\left(x_{ij} - \sum_i p_{li}\left(\sum_k a_{ik}b_{jk}\right)\right)^2$$

subject to $A, B \geq 0$,

Here, A and B remain unchanged to the previous subjections in their dimensions but $X \in \mathbb{R}^{L \times N}: X_{ij} \geq 0$ is in the space spanned by $P \in \mathbb{R}^{L \times M}$. The gradients for this formulation are $$\nabla a_{ik} J(A,B) = \Sigma_{lj}(x_{lj} - \Sigma_i p_{li} \Sigma_k a_{ik} b_{jk})(-p_{li} b_{jk})$$

$$\nabla b_{jk} J(A,B) = \Sigma_l(x_{lj} - \Sigma_i p_{li} \Sigma_k a_{ik} b_{jk})(-\Sigma_i p_{li} a_{ik}), \quad (24)$$

Which may be written in matrix form as $$\nabla_A J(A,B) = -P^T(X-P(AB^T))B$$

$$\nabla_B J(A,B) = -A^T P^T(X-P(AB^T)). \quad (25)$$

Choosing the step length $$\alpha_A = A \oslash (P^T(PAB^T)B)$$

$$\alpha_B = B \oslash ((PA)^T(PAB^T))^T \quad (26)$$

leads to the following multiplicative update rules:

$$A \leftarrow A \circledast (P^T XB) \oslash (P^T(PAB^T))^T,$$

$$B \leftarrow B \circledast ((PA)^T X)^T \oslash ((PA)^T(PAB^T))^T, \quad (27)$$

2.5 Projected Weighted NMF

For the projected NMF, weights may be added to the light field yielding the following update rules $$A \leftarrow A \circledast (P^T(W \circledast X)B) \oslash (P^T(W \circledast PAB^T)B),$$

$$B \leftarrow B \circledast ((PA)^T(W \circledast X))^T \oslash ((PA)^T(W \circledast PAB^T))^T. \quad (28)$$

It will be appreciated that each of the processes, methods, and algorithms described herein and/or depicted in the figures may be embodied in, and fully or partially automated by, code modules executed by one or more physical computing systems, hardware computer processors, application-specific circuitry, and/or electronic hardware configured to execute specific and particular computer instructions. For example, computing systems may include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some embodiments, particular operations and methods may be performed by circuitry that is specific to a given function.

Further, certain embodiments of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. In some embodiments, the non-transitory computer-readable medium may be part of one or more of the local processing and data module (140), the remote processing module (150), and remote data repository (160). The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities may be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto may be performed in other sequences that are appropriate, for example, in serial, in parallel, or in some other manner. Tasks or events may be added to or removed from the disclosed example embodiments. Moreover, the separation of various system components in the embodiments described herein is for illustrative purposes and should not be understood as requiring such separation in all embodiments. It should be understood that the described program components, methods, and systems may generally be integrated together in a single computer product or packaged into multiple computer products.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

We claim:

1. A head-mounted display system comprising:
   a frame configured to mount on a viewer;
   a light source comprising a plurality of spatially distinct light output locations;
   a spatial light modulator configured to modulate light from the light source; and
   projection optics mounted on the frame and configured to direct light from the spatial light modulator for propagation into an eye of a viewer,
   wherein the display system is configured to display a virtual object on a depth plane by injecting a set of parallactically-disparate intra-pupil images of the object into the eye within a flicker fusion threshold,
   wherein the display system is further configured to:
      increase a lateral separation between activated ones of the light output locations to increase a magnitude of parallax disparity between the parallactically-disparate intra-pupil images of the set of parallactically-disparate intra-pupil images to change a depth plane of the object from a farther depth plane to a closer depth plane to the viewer; and decrease a lateral separation between activated ones of the light output locations to decrease a magnitude of parallax disparity between the parallactically-disparate intra-pupil images of the set of parallactically-disparate intra-pupil images to change a depth plane of the object from a closer depth plane to a farther depth plane to the viewer.

2. The display system of claim 1, wherein the display system is configured to temporally multiplex display of individual intra-pupil images.

3. A method for displaying image content, the method comprising:
providing a spatial light modulator;
providing a light source configured to output light to the spatial light modulator from a plurality of different light output locations; and
displaying a virtual object on a depth plane by temporally sequentially injecting a set of parallactically-disparate intra-pupil images of the virtual object into an eye of a viewer within a flicker fusion threshold, wherein each of the intra-pupil images is formed by:
outputting light from the light source to the spatial light modulator, wherein the light is outputted from one or more associated light output locations of the light source;
modulating the light with the spatial light modulator to form an intra-pupil image corresponding to the one or more associated light output locations; and
propagating the modulated light to the eye,
wherein the one or more associated light output locations for each intra-pupil image of the set of parallactically-disparate intra-pupil images is distinct from the one or more associated light output locations for others of the intra-pupil images of the set of parallactically-disparate intra-pupil images,
changing a depth plane of the virtual object, wherein changing the depth plane comprises:
changing the depth plane from a farther depth plane to a closer depth plane to the viewer by increasing a magnitude of the distance between light output locations for different intra-pupil images of the set of parallactically-disparate intra-pupil images; or
changing the depth plane of the virtual object from a closer depth plane to a farther depth plane to the viewer by decreasing a magnitude of the distance between light output locations for different intra-pupil images of the set of parallactic ally-disparate intra-pupil images.

4. The display system of claim 1, wherein the display system is configured to spatially multiplex display of the intra-pupil images.

5. The display system of claim 1, wherein the display system is configured to temporally multiplex display of a plurality of spatially-multiplexed intra-pupil images.

6. The display system of claim 1, wherein the projection optics directs the light to a waveguide comprising incoupling optical elements and outcoupling optical elements, wherein the incoupling optical elements are configured to incouple the light into the waveguide and the outcoupling optical elements are configured to output the light from the waveguide into the eye of the viewer.

7. The display system of claim 6, wherein the waveguide is one of a plurality of waveguides, wherein each waveguide is configured to output light of a different component color than other waveguides of the plurality of waveguides.

8. The display system of claim 1, wherein the light source comprises a plurality of selectively-activated light-emitting regions.

9. The display system of claim 8, wherein the light source comprises at least one of a light-emitting diode array and a spatial light modulator.

10. The display system of claim 9, wherein the light-emitting diode array comprises an organic light-emitting diode array or an inorganic light-emitting diode array.

11. The display system of claim 9, wherein the spatial light modulator light source comprises a liquid crystal array or a digital light processing (DLP) chip.

12. The display system of claim 8, wherein the display system is configured to change a position of activated light-emitting regions during injection of at least one of the intra-pupil images into the eye.

13. The display system of claim 1, wherein the light source comprises:
a light emitter; and
an actuator configured to direct light to the spatial light modulator along different paths.

14. The display system of claim 13, wherein the actuator is a dual-axis galvanometer.

15. The display system of claim 13, wherein the light source comprises a fiber scanner.

16. The display system of claim 1, wherein the spatial light modulator configured to modulate light from the light source comprises an LCOS panel.

17. The display system of claim 1, further comprising an eye tracking sensor configured to track a gaze of the eye, wherein the display system is configured to:
determine a gaze of the eye using the eye tracking sensor; and
select content for the intra-pupil images based upon the determined gaze of the eye.

18. The display system of claim 1, wherein the display system is configured to synchronize a light output location of the light source with image content provided by the spatial light modulator.

19. The display system of claim 1, further comprising an optical mechanism between the spatial light modulator and the projection optics, wherein the optical mechanism is configured to direct light from different locations of the spatial light modulator to projection optics at different angles.

20. The display system of claim 19, wherein the optical mechanism comprises one or more of a prism or a lens structure.

21. The display system of claim 20, wherein the lens structure is a lenslet array.

22. The display system of claim 1, wherein the spatial light modulator is a digital light processing (DLP) chip.

23. The method of claim 3, wherein the flicker fusion threshold is 1/60 of a second.

24. The method of claim 3, wherein light rays forming each of the parallactically-disparate image are collimated, wherein the depth plane is at less than optical infinity.

25. The method of claim 3, further comprising an eye tracking sensor configured to track a gaze of the eye, wherein displaying the virtual object comprises:
determining a gaze of the eye using the eye tracking sensor; and
selecting content for the intra-pupil images based upon the determined gaze of the eye.

26. The method of claim 3, further comprising projection optics configured to direct modulated light from the spatial light modulator to the eye.

27. The method of claim 3, wherein the one or more associated light-emitting regions for the intra-pupil images partially overlap.

28. The method of claim 3, further comprising changing a position of the one or more associated light-emitting regions during injection of at least one of the intra-pupil images into the eye.

29. The method of claim 3, wherein the spatial light modulator is a digital light processing (DLP) chip.

30. A method for displaying image content, the method comprising:
provinding a head-mounted display comprising:
a spatial light modulator configured to modulate light to form intra-pupil images; and
a light source configured to direct light to the spatial light modulator;
displaying a virtual object on a depth plane by injecting, within a flicker fusion threshold, a set of parallactically-disparate intra-pupil images of the virtual object from the display into an eye of a viewer; and
changing a path of light from a light source to a spatial light modulator of the head-mounted display to increase a magnitude of parallax disparity between the parallactically-disparate intra-pupil images of the set of parallactically-disparate intra-pupil images as the object decreases in perceived distance to the viewer.

31. The method of claim 30, wherein injecting the set of parallactically-disparate intra-pupil images comprises temporally sequentially injecting individual ones of the intra-pupil images into an eye of a viewer.

32. The method of claim 30, wherein injecting the set of parallactically-disparate intra-pupil images comprises temporally sequentially injecting multiple intra-pupil images at a time.

33. The method of claim 30, wherein injecting the set of parallactically-disparate intra-pupil images comprises simultaneously injecting multiple ones of the intra-pupil images.

34. The method of claim 30, wherein the light beams forming the intra-pupil images are collimated.

35. The method of claim 30, wherein the light beams forming the intra-pupil images have divergent wavefronts.

36. The method of claim 30, wherein the light source comprises a plurality of selectively activated light-emitting regions, wherein injecting the set of parallactically-disparate intra-pupil images comprises activating a different light emitting region for each intra-pupil image.

37. The method of claim 30, wherein the light source is configured to output light from a plurality of distinct light output locations, further comprising jittering the light output locations during injection of at least one of the intra-pupil images into the eye.

* * * * *

UNITED STATES PATENT AND TRADEMARK OFFICE
CERTIFICATE OF CORRECTION

PATENT NO. : 11,231,584 B2
APPLICATION NO. : 15/789895
DATED : January 25, 2022
INVENTOR(S) : Michael Anthony Klug It is certified that error appears in the above-identified patent and that said Letters Patent is hereby corrected as shown below:

In the Specification

Column 10, Line 7, after "modulator" insert -- . --.

Column 18, Line 34, delete "arg min" and insert -- argmin --.

Column 22, Line 55, after "benefits" insert -- . --.

Column 32, Line 58, delete "$\nabla_A J(A, B)$" and insert -- $\nabla_{A,B} J(A, B)$ --.

Column 34, Line 6, delete "Which" and insert -- which --.

Column 34, Line 17, delete "$B \leftarrow B \circledast ((PA)^T X)^T \oslash ((PA)^T (PAB^T))^T$," and insert -- $B \leftarrow B \circledast ((PA)^T X)^T \oslash ((PA)^T (PAB^T))^T$ --.

Signed and Sealed this
Twenty-sixth Day of July, 2022

Katherine Kelly Vidal
*Director of the United States Patent and Trademark Office*